United States Patent
Mori et al.

(10) Patent No.: US 8,130,269 B2
(45) Date of Patent: Mar. 6, 2012

(54) VISUAL RECOGNITION APPARATUS, METHODS, AND PROGRAMS FOR VEHICLES

(75) Inventors: Toshihiro Mori, Okazaki (JP); Akihiro Nakajima, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 1709 days.

(21) Appl. No.: 11/369,972

(22) Filed: Mar. 8, 2006

(65) Prior Publication Data

US 2006/0215020 A1  Sep. 28, 2006

(30) Foreign Application Priority Data

Mar. 23, 2005 (JP) ................ 2005-084552
Mar. 24, 2005 (JP) ................ 2005-086211
Mar. 24, 2005 (JP) ................ 2005-086373
Mar. 24, 2005 (JP) ................ 2005-086500

(51) Int. Cl.
*H04N 7/18* (2006.01)
*H04N 7/00* (2006.01)

(52) U.S. Cl. .................. 348/148; 348/119; 348/140
(58) Field of Classification Search .............. 348/143, 348/148, 299, 314, 449
See application file for complete search history.

(56) References Cited

U.S. PATENT DOCUMENTS

| | | | | |
|---|---|---|---|---|
| 5,027,302 A * | 6/1991 | Asanuma et al. | ............... | 701/48 |
| 5,646,639 A * | 7/1997 | Koie | ............... | 345/7 |
| 6,400,405 B2 * | 6/2002 | Tomida et al. | ........... | 348/333.05 |
| 6,476,731 B1 | 11/2002 | Miki et al. | | |
| 7,245,275 B2 * | 7/2007 | Okada et al. | ............... | 345/32 |
| 2001/0016797 A1 | 8/2001 | Ogura et al. | | |
| 2002/0080018 A1 * | 6/2002 | Yamazaki | ............... | 340/436 |
| 2002/0154007 A1 * | 10/2002 | Yang | ............... | 340/456 |
| 2003/0090570 A1 * | 5/2003 | Takagi et al. | ............... | 348/148 |
| 2003/0197660 A1 * | 10/2003 | Takahashi et al. | ............... | 345/7 |
| 2004/0252389 A1 * | 12/2004 | Suggs | ............... | 359/850 |
| 2006/0287826 A1 * | 12/2006 | Shimizu et al. | ............... | 701/216 |
| 2008/0079607 A1 * | 4/2008 | Uemura | ............... | 340/932.2 |
| 2010/0079268 A1 * | 4/2010 | Yamazaki | ............... | 340/435 |

FOREIGN PATENT DOCUMENTS

| | | |
|---|---|---|
| EP | 1 065 642 A | 1/2001 |
| JP | 04-057455 U1 | 5/1992 |
| JP | A-05-278522 | 10/1993 |

(Continued)

OTHER PUBLICATIONS

Japanese Patent Office, Notification of Reason(s) for Refusal mailed Jun. 15, 2010 in Japanese Patent Application No. 2005-084552 w/Partial English-language Translation.

(Continued)

*Primary Examiner* — Hung Lam
(74) *Attorney, Agent, or Firm* — Oliff & Berridge, PLC

(57) ABSTRACT

Around-vehicle visual recognition apparatus, methods, and programs acquire circumstances of a vehicle, including the vehicle's location and cause a camera to take images around the vehicle. The apparatus, methods, and programs determine at least one first area around the vehicle that is more relevant to a driver based on the circumstances of the vehicle than another area around the vehicle and display an image of the at least one first area on a display.

12 Claims, 14 Drawing Sheets

FOREIGN PATENT DOCUMENTS

| | | |
|---|---|---|
| JP | A-06-219211 | 8/1994 |
| JP | A-08-164808 | 6/1996 |
| JP | A-2000-090393 | 3/2000 |
| JP | A-2000-194997 | 7/2000 |
| JP | A-2000-227999 | 8/2000 |
| JP | A-2001-006097 | 1/2001 |
| JP | A-2001-055100 | 2/2001 |
| JP | A-2001-260704 | 9/2001 |
| JP | A-2001-315601 | 11/2001 |
| JP | A-2002-109697 | 4/2002 |
| JP | 2002-296053 * | 9/2002 |
| JP | A-2002-314991 | 10/2002 |
| JP | A 2003-127772 | 5/2003 |
| JP | A-2003-312406 | 11/2003 |
| JP | A-2003-333586 | 11/2003 |
| JP | 2004-345554 * | 9/2004 |
| JP | A-2004-291663 | 10/2004 |
| JP | A-2005-020377 | 1/2005 |

OTHER PUBLICATIONS

Japanese Patent Office, Notification of Reason for Rejection mailed Aug. 3, 2010 in Japanese Patent Application No. 2005-086373 w/Partial English-language Translation.

Japanese Patent Office, Notification of Reason for Rejection mailed Aug. 3, 2010 in Japanese Patent Application No. 2005-086500 w/Partial English-language Translation.

Japanese Patent Office, Notification of Reason(s) for Refusal mailed May 11, 2010 in Japanese Patent Application No. 2005-086211 w/Partial English-language Translation.

Japanese Patent Office, Final Notification of Reason forRefusal mailed Jan. 11, 2011 in Japanese Patent Application No. 2005-086211 w/Partial English-language Translation.

* cited by examiner

VISUAL RECOGNITION APPARATUS, METHODS, AND PROGRAMS FOR VEHICLES

INCORPORATION BY REFERENCE

The disclosure of Japanese Patent Application Nos. 2005-084552 filed on Mar. 23, 2005, 2005-086211 filed on Mar. 24, 2005, 2005-086373 filed on Mar. 24, 2005, and 2005-086500 filed on Mar. 24, 2005 including the specifications, drawings and abstracts thereof, are incorporated herein by reference in their entirety.

BACKGROUND

1. Related Technical Fields

Related Technical Fields include visual recognition systems, methods, and programs for vehicles.

2. Description of the Related Art

Conventional visual recognition apparatuses take images around a vehicle by cameras mounted on a vehicle, such as an automobile, to assist in the driving of the vehicle (see, e.g., Japanese Unexamined Patent Application Publication No. 2003-127772). When the vehicle reaches an intersection, such a conventional apparatus causes a camera installed on a front part of the vehicle to take images in the right and left directions of the vehicle and then displays the images on a display unit. Therefore, a driver may more easily visually recognize other vehicles traveling at intersections.

SUMMARY

The above conventional visual recognition apparatuses only display images of both sides of the vehicle taken in the front part of the vehicle. Therefore, images taken in other directions or from other parts of the vehicle are not available to a driver. Specifically, images of other areas around the vehicle that are difficult for a driver to see are not available. Furthermore, such areas may vary based on the travel circumstances of the vehicle and/or the vehicle's driving situations. The above conventional visual recognition apparatuses do not change the areas which may viewed on the display unit based on changing travel circumstances of the vehicle and/or the vehicle's driving situations.

In view of at least one or more of the above-described deficiencies in conventional systems, it is beneficial to provide a visual recognition apparatus enabling a driver to accurately view more areas around a vehicle (an "around-vehicle area") and thus to easily and safely drive a vehicle without worry. This may be done, for example, by making a display unit display a plurality of image of the around-vehicle area in accordance with the vehicle's circumstances.

Various exemplary implementations of the principles described herein thus provide around-vehicle visual recognition apparatus, methods, and programs that may acquire circumstances of a vehicle, including the vehicle's location and may cause a camera to take images around the vehicle. The apparatus, methods, and programs may determine at least one first area around the vehicle that is more relevant to a driver based on the circumstances of the vehicle than another area around the vehicle and may display an image of the at least one first area on a display.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
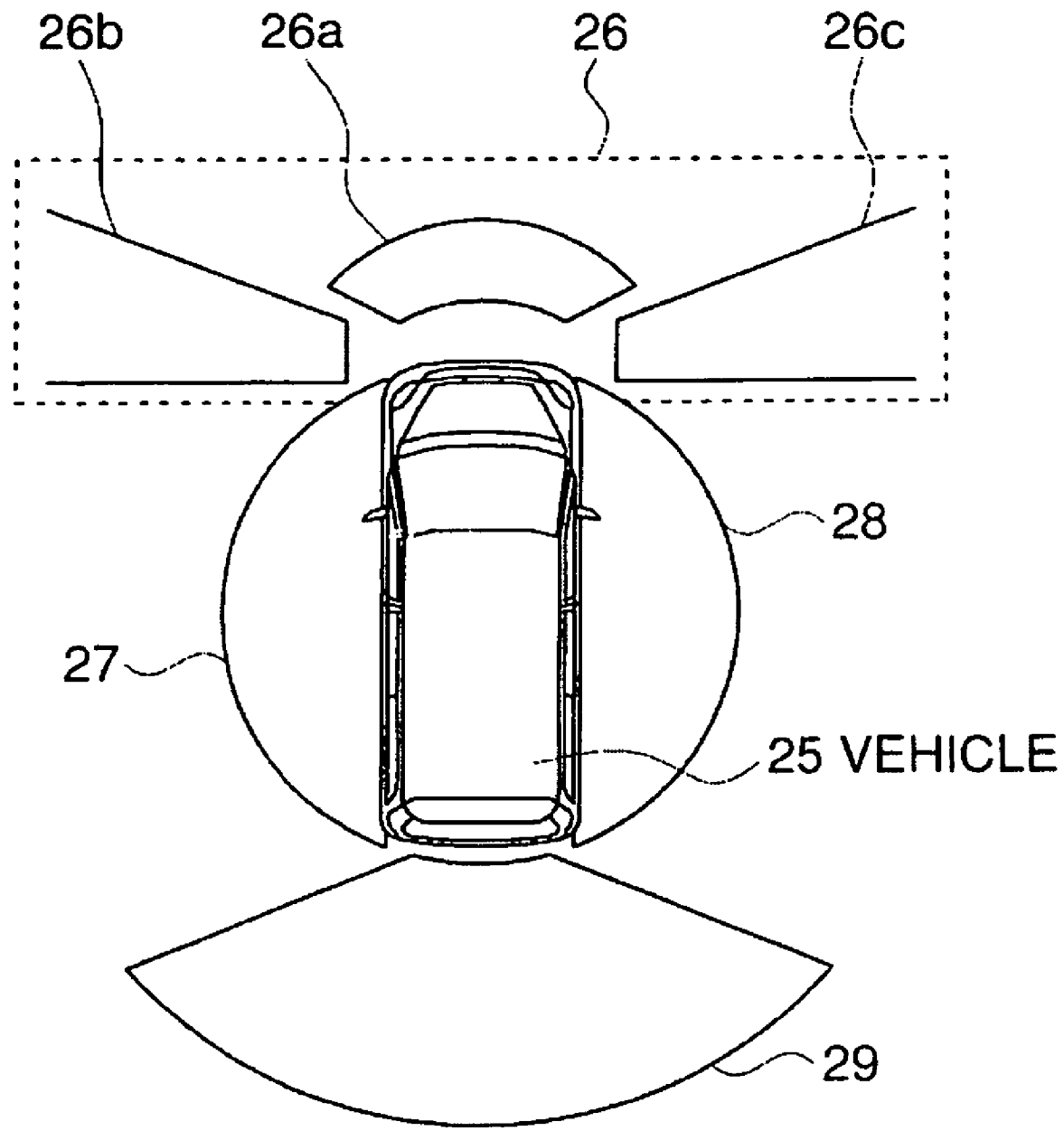
FIG. 1 shows areas of images obtained by an exemplary around-vehicle visual recognition apparatus.

FIG. 1 shows image-areas obtained by an exemplary around-vehicle visual recognition apparatus. FIG. 1 shows a vehicle 25 including the around-vehicle visual recognition apparatus 10. The vehicle 25 may be, for example, an automobile, truck, bus, or two-wheeled vehicle that can travel roads. For ease of explanation, according to this example, vehicle 25 is described as an automobile.

Figure 2:
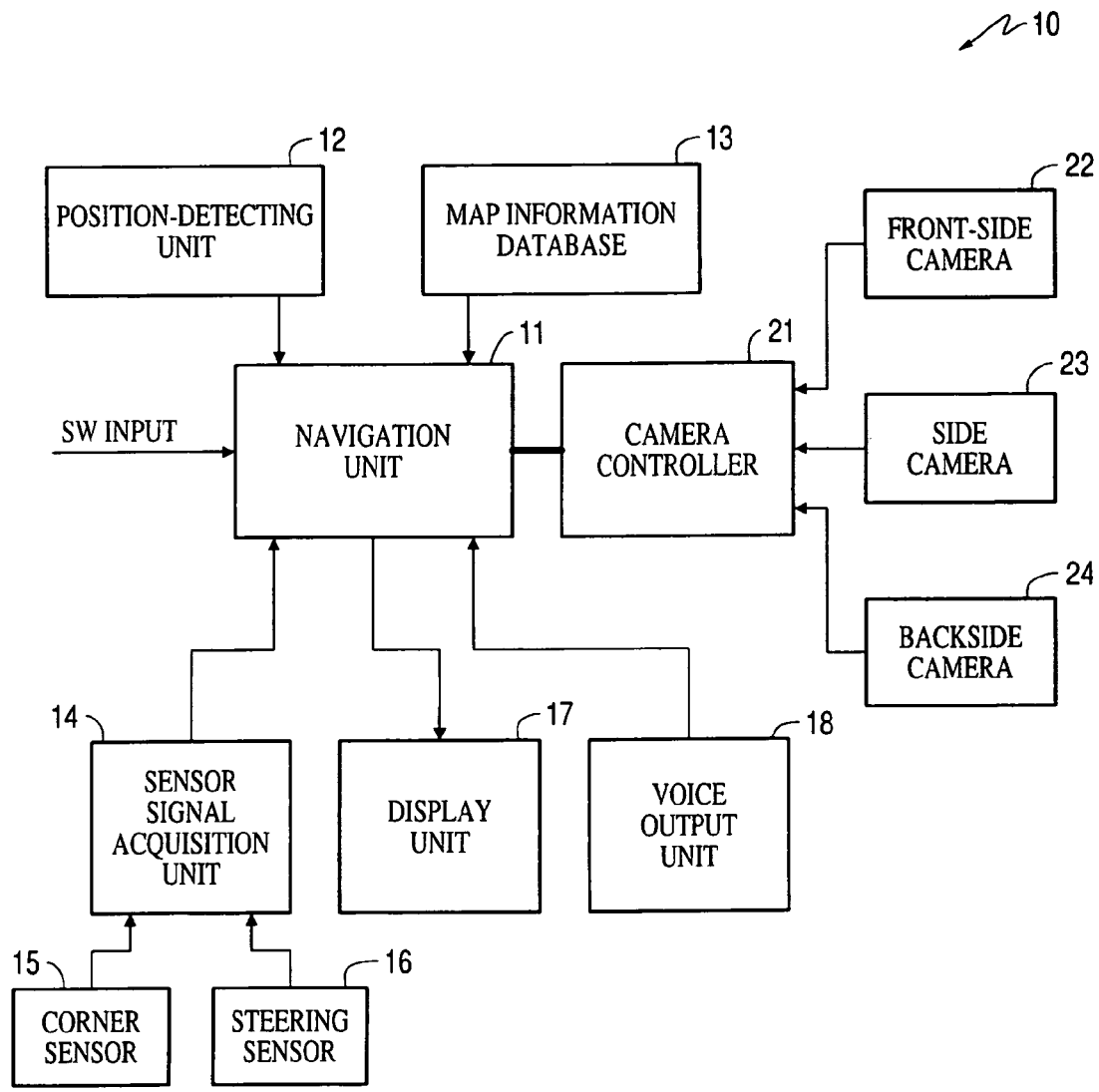
FIG. 2 is a block diagram showing an exemplary around-vehicle visual recognition apparatus.

FIG. 2 shows the configuration of an exemplary around-vehicle visual recognition apparatus. FIG. 2 shows a navigation unit 11 mounted on a vehicle, that may include, for example, a controller such as a type of computer with a calculation unit such as a CPU and/or a MPU; a recording unit such as, for example, a semiconductor memory, a magnetic disk, a magnetic tape, a magnetic drum, a flash memory, a CD-ROM, a CD-R/W, a MD, a DVD-RAM, a DVD-R/W, an optical disk, a MO, an IC card, an optical card and/or a memory card; and/or a communication unit. The navigation unit 11 may also include a an input unit for inputting information via, for example, operation keys, push buttons, a jog dial, a cross key, a remote controller and/or a touch panel. The navigation unit may include or be connected to a display unit 17 such as, for example, a CRT, a liquid crystal display, an LED (Light Emitting Diode) display and/or a holographic unit. The navigation unit 11 may include voice input unit such as, for example, a microphone and/or a voice output unit 18 such as, for example, a loud speaker and/or a headphone. The display unit 17 may be a touch panel with the function of input as well.

FIG. 2 shows a camera controller 21 mounted on the vehicle. The camera controller may include, for example, a type of computer with a calculation unit such as a CPU and/or a MPU, and a recording unit such as a semiconductor memory, a magnetic disk, a magnetic tape, a magnetic drum, a flash memory, a CD-ROM, a CD-R/W, a MD, a DVD-RAM, a DVD-R/W, an optical disk, a MO, an IC card, an optical card and/or a memory card. The navigation unit 11 and the camera controller 21 may be connected for intercommunication. The camera controller 21 may be provided separately or included in the navigation unit 11.

Returning to FIG. 1, the vehicle 25 may mount, for example, a front-side camera 22, a side camera 23, and/or a backside camera 24. These cameras 22, 23, 24, may be controlled by the camera controller 21. The front-side camera 22, the side camera 23, and the backside camera 24 may be provided with image pickup units such a CCD (Charge Coupled Device) and/or a CMOS (Complementary Metal Oxide Semiconductor) and may be installed on a front-side, a flank and a backside of the vehicle. The cameras 22, 23, 24 may be configured to take images around the vehicle 25 transmit the images to the camera controller 21. As shown in FIG. 1, the front-side camera 22 may take a front-side image-area 26, the side camera 23 may take a left-side image-area 27 and a right-side image-area 28, and the backside camera 24 may take a backside image-area 29. The front-side image-area 26 may include a front image-area 26*a*, a front edge left-side image-area 26*b*, and a front edge right-side image-area 26*c*. Note that the exact placement and areas of the front-side image-area 26, of the left-side image-area 27, of the right-side image-area 28, and of the backside image-area 29 shown in FIG. 1 are exemplary; thus, they may be varied accordingly.

Furthermore there may be more than one of each of the front-side camera 22, of the side camera 23, and of the backside camera 24. For example, the front-side camera 22, shown in FIG. 2, may be 3 cameras for taking respectively the front image-area 26*a*, the front edge left-side image-area 26*b*, and the front edge right-side image-area 26*c*. Alternatively, the front-side camera 22 may be a camera with an optical system such as, for example, a fisheye lens, a PRISM, and/or one or more optical fibers, which take the front image-area 26*a*, the front edge left-side image-area 26*b*, and the front edge right-side image-area 26*c*. Similarly, the side camera 23 may be 2 cameras that respectively take the left-side image-area 27 and the right-side image-area 28, or may be more than 2 cameras that respectively take the left-side image-area 27 and the right-side image-area 28. The backside camera 24 may be 2 or more cameras for taking the backside image-area 29.

The front-side camera 22, the side camera 23, and the backside camera 24 may also be a camera or cameras with a changeable focus mechanism able to change image modes from close-up to telephoto. In other words, the camera(s) may be able to zoom. Also the front-side camera 22, the side camera 23, and the backside camera 24 may be installed in order to move the image-area from side to side and/or up and down. That is the camera(s) may tilt and/or pan. The camera controller 21 may control these actions of the front-side camera 22, of the side camera 23, and of the backside camera 24, such as zooming, tilting, and panning.

A position-detecting unit 12 may be connected to the navigation unit 12. The position-detecting unit 12 may detects, for example, a vehicle current location, a vehicle speed, a vehicle acceleration, and/or vehicle direction using a variety of sensors, such as, for example, a GPS (Global Positioning System) sensor for detecting a current position on the Earth by receiving electronic wave transmitted from a GPS satellite; a magnetic sensor for detecting earth magnetism; a distance sensor for computing vehicle driving distance; a gyro sensor for computing vehicle orientation; a beacon sensor for detecting a current position by receiving position information from beacons installed along on roads; an accelerator pedal position sensor for detecting an accelerator pedal position; a brake sensor for detecting a movement of a brake pedal operated by a driver; a turn signal sensor for detecting a movement of a turn signal lever operated by a driver; a shift lever sensor for detecting a movement of a shift lever of a transmission operated by a driver; an altimeter; a vehicle speed sensor for detecting the speed of a vehicle. The navigation unit 11 may perform navigation processing based on, for example, one or more of the vehicle current location, vehicle speed, vehicle accelerated velocity, and/or vehicle orientation detected by the position-detecting unit 12. Note that the position-detecting unit 12 may be connected to or included in the navigation unit 11.

A map information database 13 may be connected to or included in the navigation unit 11. The map information database 13 may store map information necessary to search for facilities, geographic points, and/or routes. The map information database 13 may include a road data file. The road data file may store, for example, data on all roads in Japan, including narrow streets. The road data file may also include, for example, intersection data, node data, road data, traffic regulation data and route display data. The intersection data may include data on each of intersections, such as, intersection identification numbers, roads connecting to appropriate intersections with the respective roads' number. The intersection data may include data for distinguishing intersection types, specifically, for example, distinguishing between intersections with traffic signals and intersections without traffic signals.

As used herein, the term link refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein, the term "node" refers to a point connecting two or more links. A node may be, for example, an intersection, an intersection having more than three roads, a point along a curve, and/or a point at which a road type changes. The node data may indicate at least locations and road forms stored in a map data file and consist of data on actual road forks (including such as intersections and/or T-junctions), nodes, and links connecting between each node.

The road data may include data on each road with its respective identification number. The road data may include road types, a length of each road, and/or a time necessary to travel each road. The road types may include, for example, government road attributes such as a national road, a prefectural road, a principle regional road, and/or a highway.

The road data may include, for each road, a width, a slope, a cant, an altitude, a bank, a road surface condition, presence or absence of dividing strips, location and/or number of traffic lanes, reduction points of traffic lanes, and/or road-narrowing points. In the case of highways and/or main roads, each set of lanes in opposite directions may be stored as an individual road, and/or treated as a double road. For example, in the case of main roads with 4 or more lanes, they may be considered as double roads, and the set of inbound lanes and the set of outbound lanes may be respectively stored as independent roads in the road data. In addition, for road corners, the road data may include, for example, curvature radius, an intersection, a T-junction, and/or a corner entrance. The road data may include road attributes such as, for example, the existence and attributes of a railroad crossing, a highway entrance/exit ramp, a highway tollgate, a descending road, and/or an ascending road. The map data may include map data for drawing a map, based on or including such data as a node, a link, coordinates, and/or a facility location.

The map information database 13 may include, for example, map data for storing map drawing data and/or a POI (Point Of Interest) data file. The map drawing data may include data, such as a node, a link, coordinates and/or a facility. And the POI data file stores such as facility data, Town Page (R) data, and/or event data for searching for points such as a starting point, a destination, a waypoint. Note that the map information database 13 may be connected to or included in the navigation unit 11.

A sensor signal acquisition unit 14 may be connected to the navigation unit 11. The sensor signal acquisition unit 14 may be, for example, a type of computer with a calculation unit such as a CPU and/or a MPU and/or a recording unit such as a semiconductor memory and/or a magnetic disk. The sensor signal acquisition unit 14 may be attached to or included in the navigation unit 11. Corner sensors 15, for example, installed at each of 4 corners of a vehicle 25 and a steering sensor 16 for computing a steering angle may be connected to the sensor signal acquisition unit 14. The corner sensor 15 may be, for example, a sensor for measuring distance, such as an ultrasonic sensor, a laser radar, and/or a millimeter wave radar. The corner sensor 15 may detect whether a corner of a vehicle 25 reaches a set distance from an obstacle. The corner sensor(s) 15 may be installed at only some of the corners of the vehicle 25. Furthermore, the set distance can be changed as necessary. The sensor signal acquisition unit 14 may process, for example, a sensor signal from the corner sensor 15 and/or the steering sensor 16 and may transmit the processed signal to the navigation unit 11.

The around-vehicle visual recognition apparatus 10, may be physically, functionally, and or conceptually divided into a vehicle circumstances acquisition unit for determining the current circumstances of a vehicle 25, and an image-acquiring unit for taking images around the vehicle 25. In this case, the vehicle circumstances acquisition unit may include, for example, the navigation unit 11, the position-detecting unit 12, the map information database 13, the sensor signal acquisition unit 14, one or more corner sensors 15, and/or a steering sensor 16. The image pickup unit may include, for example, the camera controller 21, the front-side camera(s) 22, the side camera(s) 23, and/or the backside camera(s) 24. The around-vehicle visual recognition apparatus 10 may be connected to or include a display unit 17 that displays, for example, in shifts, a plurality of images from around the vehicle 25 depending upon the circumstances of the vehicle 25 as determined by, for example, the vehicle circumstances acquisition unit.

Hereinafter, operations of the around-vehicle visual recognition apparatus 10 with the above-mentioned configuration will be described.

Figure 3:
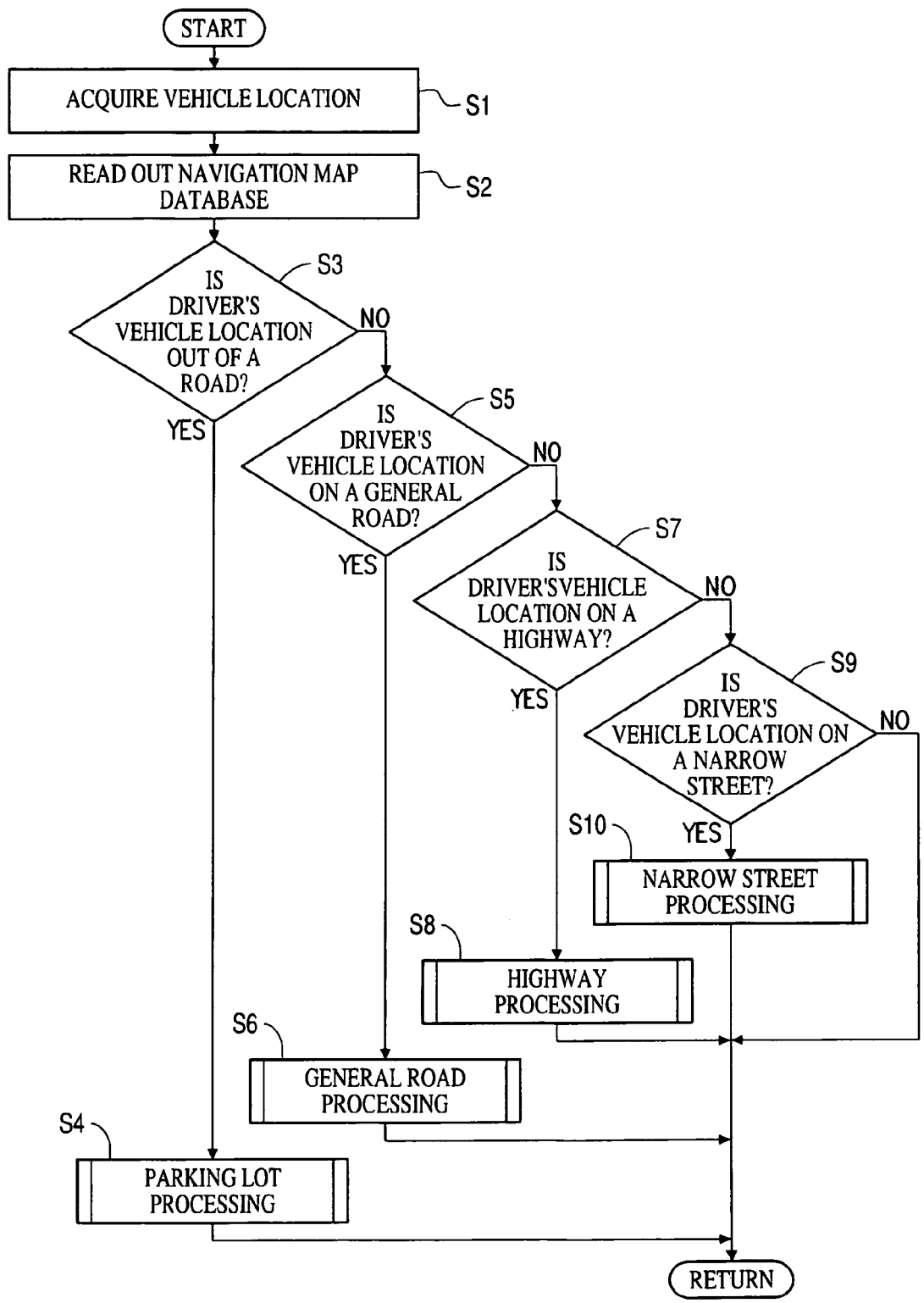
FIG. 3 shows an exemplary around-vehicle visual recognition method.

FIG. 3 shows an exemplary around-vehicle visual recognition method. The exemplary method may be implemented, for example, by one or more components of the above-described around-vehicle visual recognition apparatus. However, even though the exemplary structure of the above-described around-vehicle visual recognition apparatus may be referenced in the description, it should be appreciated that the referenced structure is exemplary, and the exemplary method need not be limited by any of the above-described exemplary structure.

As shown in FIG. 3, first, an around-vehicle visual recognition apparatus 10 acquires a driver's vehicle location is acquired (Step S1), for example, by the around-vehicle visual recognition apparatus 10. For example, the position-detecting unit 12 may acquire as the driver's vehicle location, a current location of the vehicle 25. Next, navigation map data is read out (Step S2), for example, the around-vehicle visual recognition apparatus 10 may read map data out of the navigation map database. Specifically, map information may be read from map information database 13, based on the driver's vehicle location. The map information may include, for example, road data related to the driver's vehicle location road and/or facility data.

Next, it is determined whether the driver's vehicle location is not on a road (Step S3), for example, by the around-vehicle visual recognition apparatus 10. If the driver's vehicle location is not on a road (Step S3=Yes), it may be assumed that the driver's vehicle location is on a parking lot or a facility site. Accordingly, a parking lot process is performed (Step S4), for example, by the around-vehicle visual recognition apparatus 10. The parking lot process may be performed, for example, by the exemplary method of FIG. 5. In this case, data on relatively large facility such as, for example, a shopping center, a theme park, and/or a golf course may be stored in the map information database 13 and that data may be accessed. Even if the driver's vehicle location is not on any of facility sites stored in the map information database 13, when the driver's vehicle location is not on a road, it is likely that the driver's vehicle is in a parking lot. Thus, in spite of the lack of facility information, when the driver's vehicle location is not on the road, the parking lot process may be performed.

If the driver's vehicle location is on the road (Step S3=No), it is then determined whether the driver's vehicle location is on a general road or not (Step S5). A general road may be, for example, a national road, a prefectural road, a principle regional road of government road attributes, and does not include highways and/or narrow streets. When the driver's vehicle location is on the general road (Step S5=Yes), a general road process may be performed (Step S6). The general road process may be performed, for example, by the exemplary method of FIG. 7.

If the driver's vehicle location is not on the general road (Step S5=No), it is determined whether the driver's vehicle location is on a highway (Step S7), for example, by the around-vehicle visual recognition apparatus 10. Highways may include, for example, not only intercity highways such as a Tomei Highway and/or a Meishin Highway, but also city highways used in regions such as, Hanshin, Nagoya and/or Fukuoka/Kitakyusyu. When the driver's vehicle location is on the highway (Step S7=Yes), a highway process is performed (Step S8). The highway process may be performed, for example, by the exemplary method of FIG. 9.

If the driver's vehicle location is not on the highway (Step S7=No), it is then determined whether the driver's vehicle location is on a narrow street (Step S9). A narrow street may be, for example, a local street used for daily life and/or a street with a little traffic. A narrow street may be a street whose width is less than a predetermined value, for example, about 5.5 m. When the driver's vehicle location is on the narrow street (Step S9=Yes), a narrow street process is performed (Step S10). The narrow street process may be performed, for example, by the exemplary method of FIG. 11. If the driver's vehicle location is not on the narrow street (Step S9=No), operation of the exemplary method ends.

Hereinafter, operations of the parking lot processing will be described.

Figure 4:
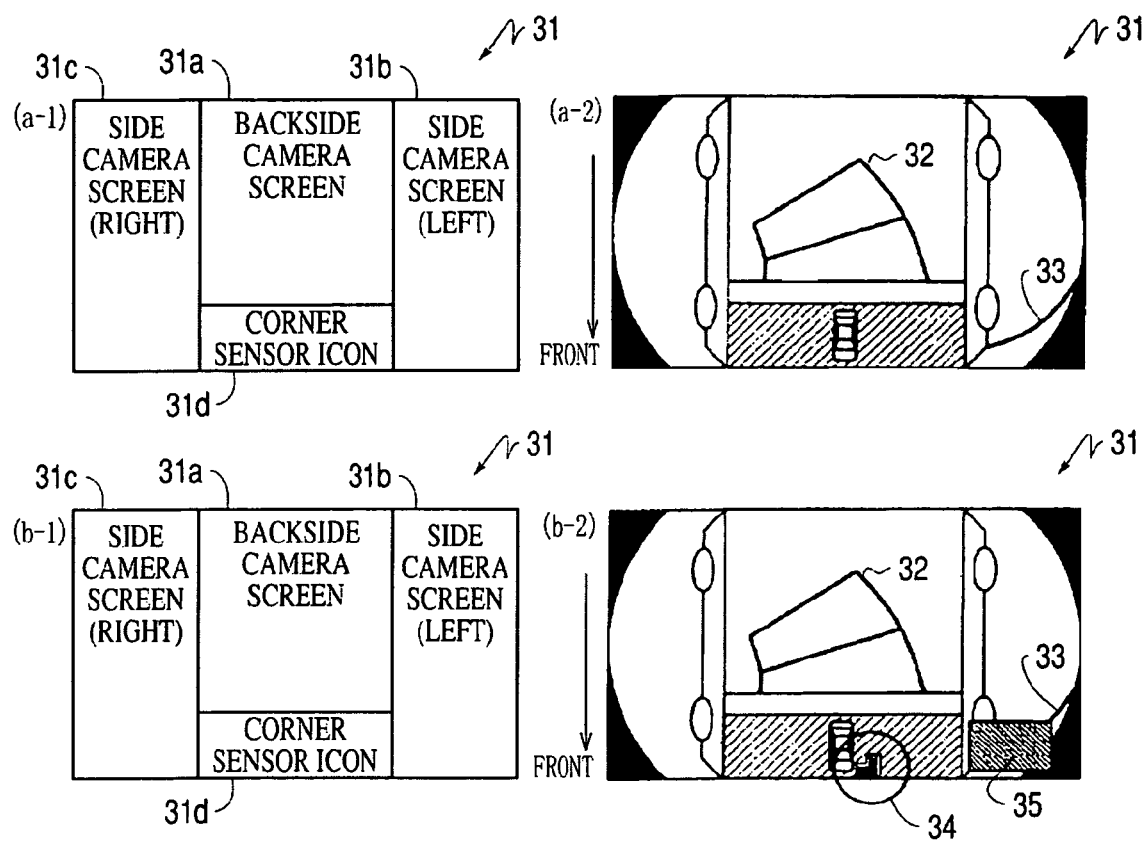
FIG. 4 shows an exemplary screen for showing parking information.
Figure 5:
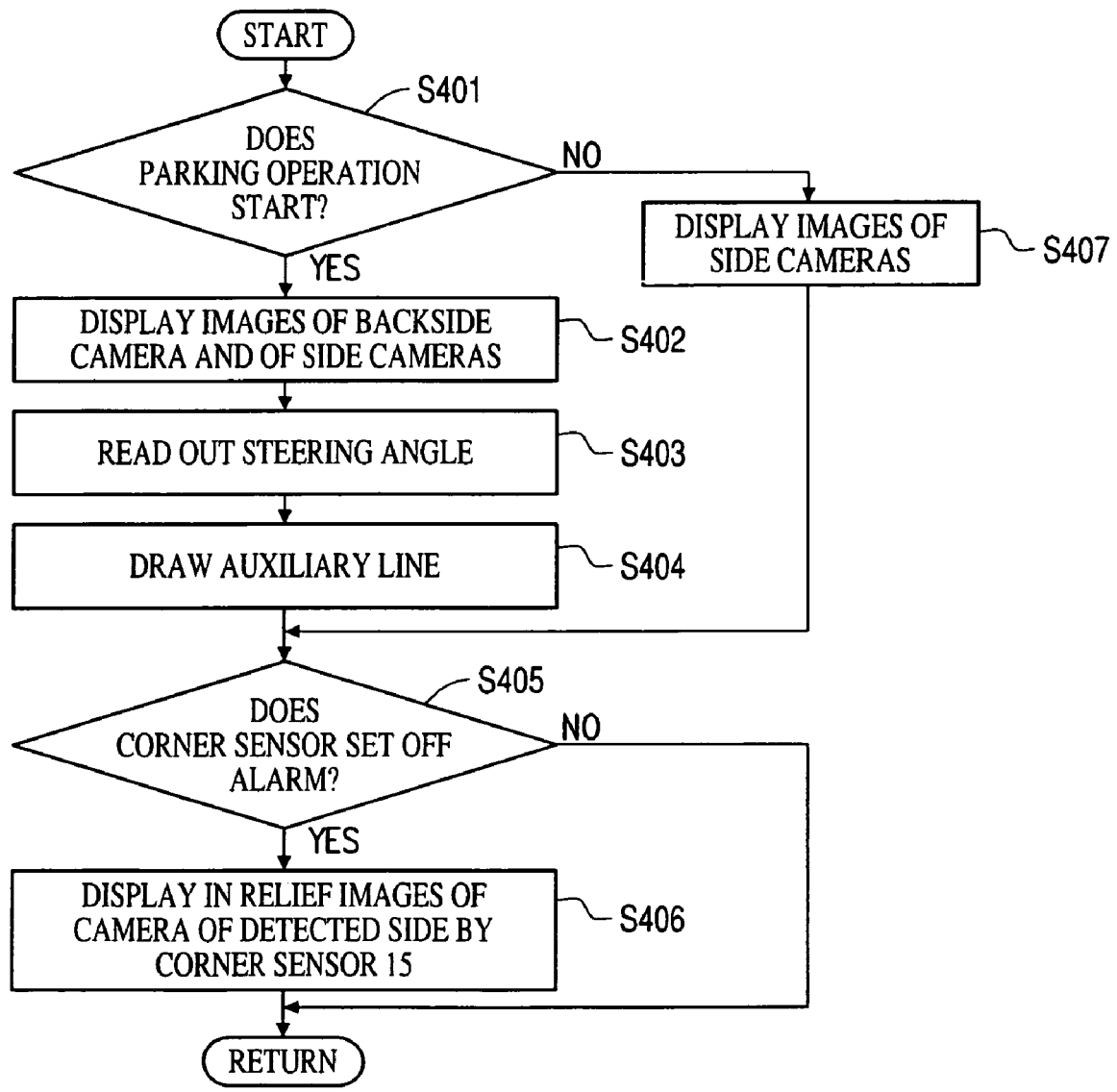
FIG. 5 shows an exemplary method of providing parking information.

FIG. 4 shows an exemplary display that may be used during parking lot processing. FIG. 5 shows an exemplary method of providing parking information that may be used during parking lot processing. The exemplary method may be implemented, for example, by one or more components of the above-described around-vehicle visual recognition apparatus 10. However, even though the exemplary structure of the above-described around-vehicle visual recognition apparatus 10 may be referenced in the description, it should be appreciated that the referenced structure is exemplary, and the exemplary method need not be limited by any of the above-described exemplary structure.

Note that screen representations (a-1) and (b-1) in FIG. 4 represent the display contents of a divided screen, and screens (a-2) and (b-2) in FIG. 4 show screen-display examples.

As shown in FIG. 5, first, it is determined whether a parking operation has started (Step S401), for example, by the around-vehicle visual recognition apparatus 10. For example, it may be determined whether there is a parking indication operation. In this case, a parking indication may be, for example, a driver's shift change to a reverse gear, the lighting of a reverse light, and/or a driver's activation of a parking indication operation switch.

If the parking indication operation is performed (Step S401=Yes), backside images are displayed (Step S402). For example, the around-vehicle visual recognition apparatus 10 may make the display unit 17 display, as images of a backside of the vehicle 25, images of the backside camera(s) 24 and as images of sides of the vehicle 25, images of the side camera(s) 23. In this case, a screen 31 such as shown in (a-2) in. FIG. 4 may be displayed on the display unit 17. The screen 31 as shown in (a-1) in FIG. 4 may be divided into 4 screens: a backside camera screen 31a displaying images of a backside camera; a left side camera screen 31b displaying images of a left side camera; a right side camera screen 31c displaying images of a right side camera; and a corner sensor icon screen 31d displaying a corner sensor icon.

If the driver's vehicle location is out of a road, the around-vehicle visual recognition apparatus 10 may assume that parking is being performed regardless of a vehicle orientation. Accordingly, the screen 31 may remain on a display until the driver's vehicle location goes out of a parking lot. In other words, while the driver's vehicle location is on the parking lot, for example, even if the reverse gear changes to another position, the screen 31 keeps on display such as shown in (a-2) in FIG. 4.

In screen (a-2) in FIG. 4., the front of the vehicle 25 may be shown so as to be oriented downward in FIG. 4., however, the backside camera screen 31a, the left side camera screen 31b, the right side camera screen 31c, and the corner sensor icon screen 31d may change their direction to display, by performing vertical inversions in accordance with a traveling direction of the vehicle 25.

Next, a steering angle is computed and read out (Step S403). For example, the steering angle may be computed by the steering sensor 16, and read out by the around-vehicle visual recognition apparatus 10. Based on the steering angle, auxiliary lines may be drawn (Step S404) such as, for example, the anticipated whole track line 32 and the anticipated side track line 33 shown in (a-2) in FIG. 4.

Note that in screen (a-2) in FIG. 4, the anticipated whole track line 32 may indicate an anticipated track of the back of the vehicle 25. The anticipated side track line 33 may indicate the anticipated track of the front-side edge of the vehicle 25, that is, the front corner of the vehicle 25. Thus, for example, when the vehicle 25 moves forward, the side anticipated track line 33 may be drawn corresponding to a turning inside image in either or both of the images of left and right side cameras, and it may indicate an anticipated track of a backside edge (e.g., back corner or wheel) of the vehicle when turning. Similarly, when a vehicle moves backward, the side anticipated track line 33 may be drawn in a corresponding to a turning outside image in either or both of the images of left and right side cameras, and it may indicate an anticipated track of a front corner of the vehicle when turning. Note that if the parking initial operation is not performed (Step S401=No), the around-vehicle visual recognition apparatus 10 may display images of a side camera (Step S407), and may not perform such operations from displaying of images of the side camera and of the backside camera to drawing auxiliary lines.

Next, it may be determined whether a corner sensor 15 detects that a corner of a vehicle 25 reaches a set distance from an obstacle, in other words, it may be determined whether the corner sensor 15 sets off an alarm (Step S405). If the corner sensor 15 does not set off the alarm (Step S405=No), then operation of the exemplary method ends. If the corner sensor 15 sets off the alarm (Step S405=Yes), a corresponding corner is displayed as shown in screen (b-2) in FIG. 4. In screen (b-2), the around-vehicle visual recognition apparatus 10 displays the corresponding corner in relief by surrounding it with a frame 35. Furthermore, for example, to call a driver's attention, a inside color of the frame 35 can be different from other parts of the screen, an image within the frame 35 could be blinked, only the image within the frame 35 can be amplified, an image of a corner sensor icon 34 can be displayed, and/or an warning beep can be set off from the voice output unit 18. Operation of the exemplary method ends.

Figure 6:
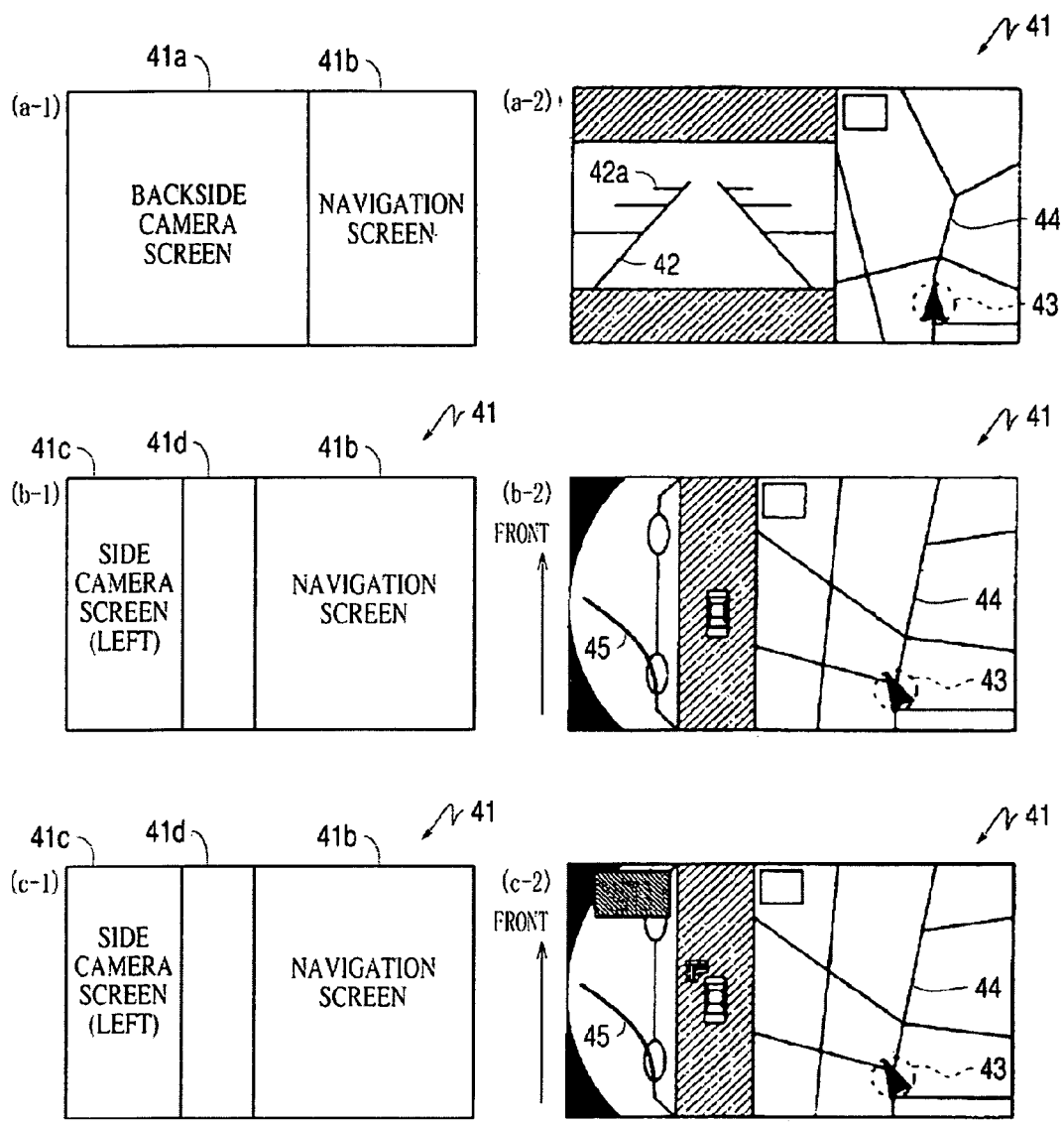
FIG. 6 shows an exemplary screen for showing general road information.
Figure 7:
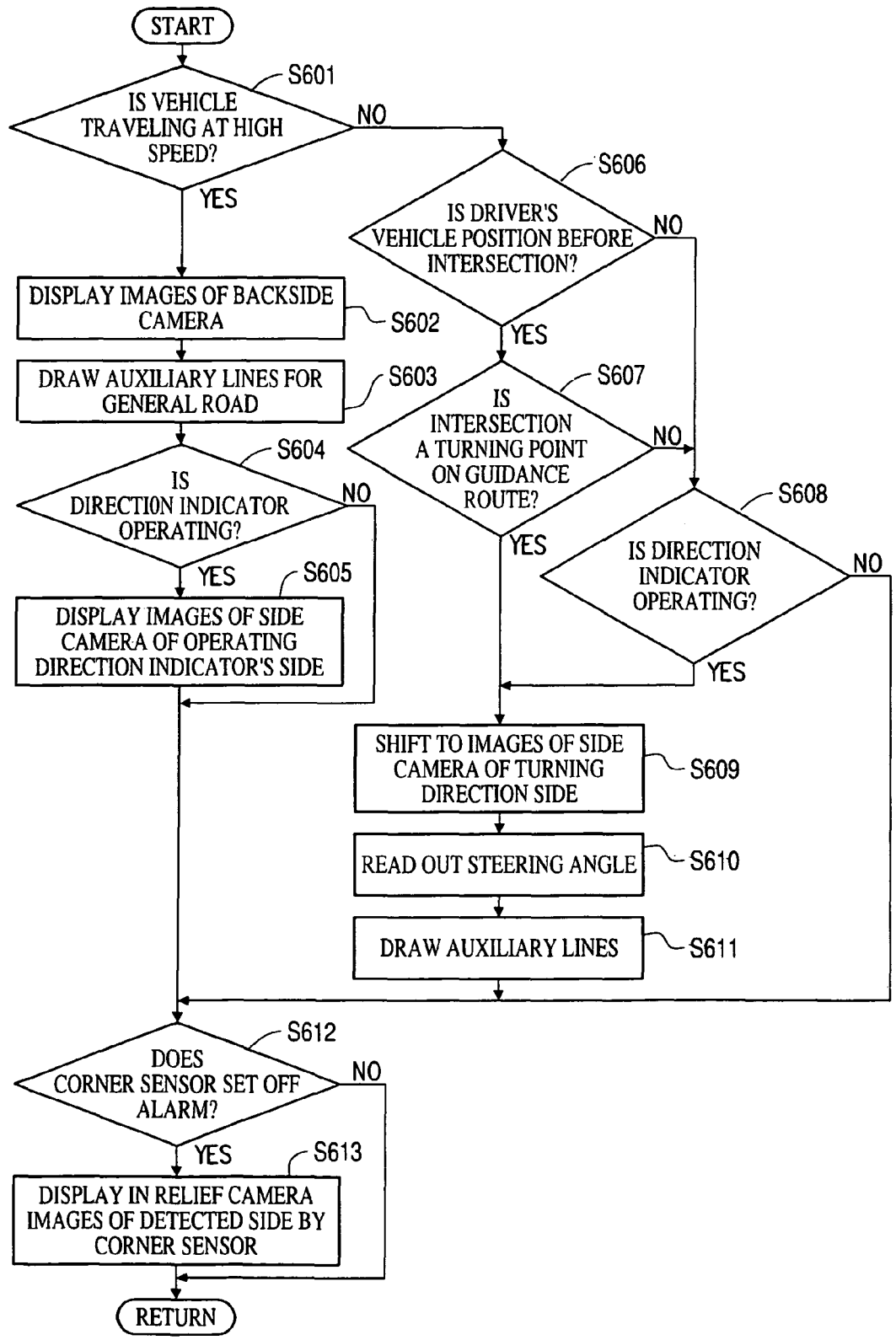
FIG. 7 shows an exemplary method of providing general road information.

FIG. 6 shows an exemplary display that may be displayed during general road processing. FIG. 7 shows an exemplary method of providing general road information that may be used during general road processing. The exemplary method may be implemented, for example, by one or more components of the above-described around-vehicle visual recognition apparatus 10. However, even though the exemplary structure of the above-described around-vehicle visual recognition apparatus 10 may be referenced in the description, it should be appreciated that the referenced structure is exemplary, and the exemplary method need not be limited by any of the above-described exemplary structure.

Note that screen representations (a-1), (b-1) and (c-1) in FIG. 6 show display contents of a divided screen, and screens (a-2), (b-2) and (c-2) in FIG. 6 show screen-display examples.

As shown in FIG. 7, first, it is determined whether the vehicle is traveling at a high speed (Step S601). For example, it may be determined whether a speed computed by the position-detecting unit 12 is a higher speed than a predetermined speed for a general road, for example, about 20 km/hour.

For example, when the vehicle speed is higher than the predetermined speed (Step S601=Yes), the vehicle 25 may be considered traveling along a road and images of a backside camera may be displayed (Step S602). For example, the around-vehicle visual recognition apparatus 10 may cause the display unit 17 to display images taken by backside camera 24, in preparation for lane changes. In this case, a screen 41 as shown in screen (a-2) in FIG. 6 may be displayed on the display unit 17. Note that the screen 41 as represented in screen representation (a-1) may be divided into 2 screens: a backside camera screen 41a on which images of the backside camera may be displayed and a navigation screen on which navigation images by the navigation unit 11 may be displayed. In the navigation images, for example, a driver's vehicle position mark 43 indicating a driver's vehicle position and road lines 44 showing roads may be displayed.

Next, auxiliary lines may be drawn in the images of the backside camera, for backward monitoring on a general road (Step S603). For example, auxiliary lines 42 for the general road may be drawn on the display unit 17 by the around-vehicle visual recognition apparatus 10. The auxiliary lines for backward monitoring 42 may be extension lines of a vehicle 25, that is, lines extending backward from both sides of the vehicle 25 with, for example, distance marks 42a as measures. The distance marks 42*a* may be used as distance measures from the back of the vehicle 25. The auxiliary lines 42 may be drawn on both sidelines of a lane. Thus, when the vehicle 25 travels on one of two lanes for each direction, its vehicle position is detected and distance marks 42*a* may be drawn only on the one side. An interval between the distance marks 42*a* may be, for example, about the length of an ordinary automobile, about 5 m. Accordingly, a driver may estimate a distance between his/her vehicle and a following vehicle. A driver can set the interval between the distance marks 42*a* separately for each type of roads such as a general road and/or a highway, and/or depending on travel speed. For example, for a general road, the interval may be about 10 m. For the highway, the interval may be about 30 m. When set based on speed, for lower than 60 km/h travel speed, the interval may be about 10 m. For higher than about 60 km/h travel speed, the interval may be about 30 m. As another option, the auxiliary lines for backward monitoring 42 and the distance marks 42*a* can be set to display, for example, only when other vehicles are recognized in the images of the backside camera.

It is next determined whether a direction indicator (e.g., a turn signal) of the vehicle 25 is operating (Step S604). If the direction indicator of the vehicle 25 is operating (Step S604=Yes), lane changes may be taken into account. Hence, for example, the around-vehicle visual recognition apparatus 10 may cause the display unit 17 to display images of the side camera(s) 23 on the side of the operating direction indicator, that is, on a turning direction side (Step S605). Thus, for example, a screen showing images of the side camera taken by the side camera 23, along with a backside camera screen 41*a* may be shown on display unit 17. Based on the images, a driver can visually recognize other vehicles that intend to pass his/her vehicle from behind. If the direction indicator of the vehicle 25 is not operating (Step S604=No), since a lane change is not taken into account, it is not necessary to display the images of the side camera. Instead of, or in addition to, the operation of direction indicator, a steering angle computed by the steering sensor 16, may be used to determine whether a lane change is occurring.

If the travel speed is not higher than the predetermined speed (Step S601=No), it is determined whether the driver's vehicle position is before an intersection (Step S606). For example, it may be determined whether the intersection is within a predetermined distance from the driver's vehicle position, for example about 30 m. If the intersection is within a predetermined distance, it may be presumed that the driver's vehicle position is before an intersection (Step S606=Yes) and it is determined whether the intersection is a turning point on a guidance route (Step S606). In other words, it is determined whether the intersection corresponds to a turning point on the guidance route for route guidance to a destination by the navigation unit 11. If the intersection is a turning point on the guidance route (Step S606)=Yes), it is likely that the vehicle will turn to the right or left. Thus, for example, the around-vehicle visual recognition apparatus 10 may shift to images of the side camera of the turning direction side. In other words, images of the side camera of the turning direction side may be displayed on the display unit 17.

If the driver's vehicle position is not before an intersection (Step S606=No) and/or if the intersection is not a turning point on the guidance route when before an intersection (Step S607=No), it is then determined whether the direction indicator of the vehicle 25 is operating (Step S608). If the direction indicator of the vehicle 25 is operating (Step S608=Yes), it is considered that the vehicle will turns to the right or left, so images of the side camera of the turning direction side are shown (Step S609), for example, on the display unit 17. In this case, for example a screen 41 as shown in (b-2) in FIG. 6 may be displayed on the display unit 17. Screen (b-1) in FIG. 6 shows an exemplary case where the vehicle 25 turns to the left at an intersection. The screen 41 as shown in screen representation (b-1) in FIG. 6 may be divided into 3 screens: a side camera screen 41*c* on which images of the side camera are displayed, an icon corner sensor screen 41*d* on which a corner sensor icon is displayed, and a navigation screen 41*b* on which navigation images by the navigation unit 11 are displayed.

Next, the a steering angle, for example, computed by the steering sensor 16, is read out (Step S610) and auxiliary lines are drawn on the basis of the read steering angle (Step S611) such as, for example, an anticipated side track line 45 shown in (b-2) in FIG. 6. Note that in screen (b-2) in FIG. 6, since the vehicle 25 goes ahead, the anticipated side track line 45 indicates an anticipated track of a left back corner or a left back wheel of the vehicle 25 on the turning inside.

Next, it is determined whether a corner sensor 15 detects that a corner of the vehicle 25 is within a set distance of an obstacle, in other words, whether or not the corner sensor 15 sets off an alarm (Step S612). If the corner sensor 15 does not set of the alarm (Step S612=No), the processing is closed. If the corner sensor 15 sets of the alarm (Step S612=Yes), a corresponding corner is shown (Step S613), for example, as shown in screen (c-2) in FIG. 6. In the example shown in screen (c-2) in FIG. 6, the around-vehicle visual recognition apparatus 10 may displays the corresponding corner by surrounding it with a frame 46. In this case, to attract driver's attention, for example, an inside color of the frame 46 may be different from other parts, a inside image of the frame 46 may be blinked, only the inside image of the frame 46 may be amplified, a corner sensor icon image may be displayed, and/or an warning beep may be set off from the voice output unit 18.

Figure 8:
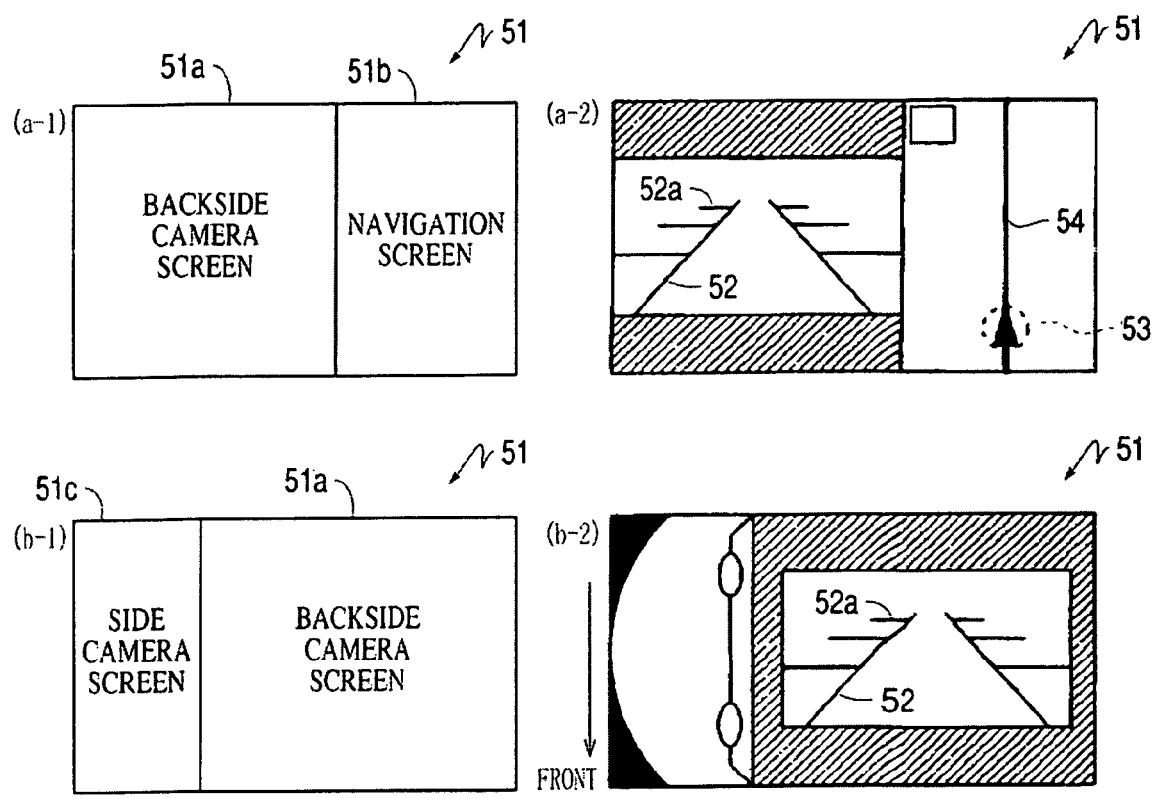
FIG. 8 shows an exemplary screen for showing highway information.
Figure 9:
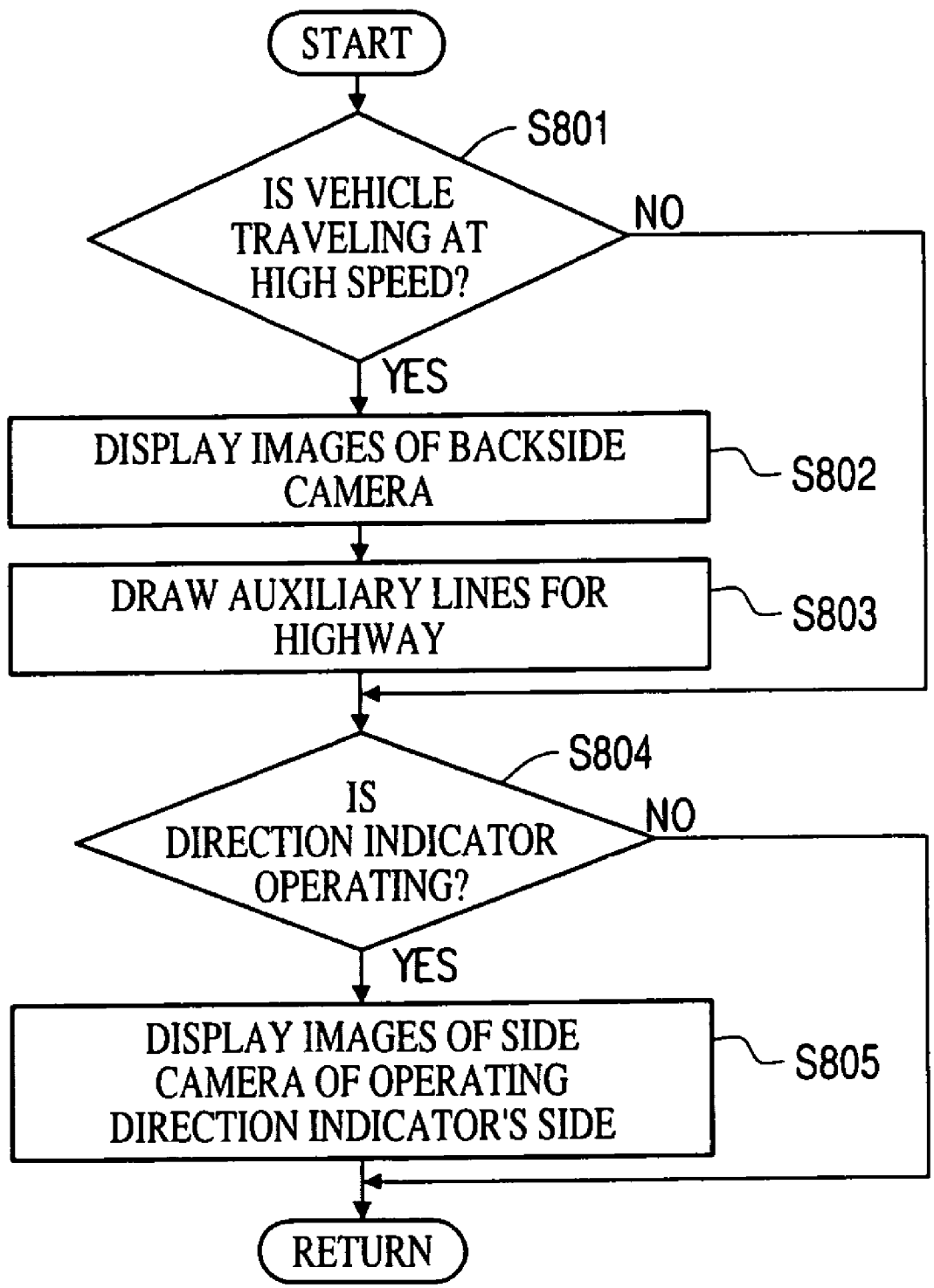
FIG. 9 shows an exemplary method of providing highway information.

FIG. 8 shows an exemplary display that may be displayed during highway processing. FIG. 9 shows an exemplary method of providing highway information that may be used during highway processing. The exemplary method may be implemented, for example, by one or more components of the above-described around-vehicle visual recognition apparatus 10. However, even though the exemplary structure of the above-described around-vehicle visual recognition apparatus 10 may be referenced in the description, it should be appreciated that the referenced structure is exemplary, and the exemplary method need not be limited by any of the above-described exemplary structure.

Note that screen representations (a-1) and (b-1) in FIG. 8 show display contents of a divided screen, and screens (a-2) and (b-2) in FIG. 8 show screen-display examples.

As shown in FIG. 9, first, it is determined whether the vehicle is traveling at a high speed (Step S801). For example, it may be determined whether a speed computed by the position-detecting unit 12 is higher than a predetermined speed for a highway, for example, about 60 km/hour.

If the vehicle is traveling at a high speed (Step S801=Yes), for example, the vehicle 25 can be considered traveling at a high speed, and thus not being involved in a traffic jam. In such circumstances, backside images are displayed (Step S802). For example, the around-vehicle visual recognition apparatus 10 may cause the display unit 17 to display images taken by the backside camera 24, in preparation for lane changes. In this case, a screen 51 as shown in screen (a-2) in FIG. 8 may be displayed on the display unit 17. Note that the screen 51 as shown in representation (a-1) in FIG. 8 may divided into 2 screens: a backside camera screen 41*a* on which images of the backside camera may be displayed and a navigation screen on which navigation images by the navigation unit 11 may be displayed. In the navigation images, a driver's vehicle position mark 53 indicating a driver's vehicle position and road lines 54 showing roads may be displayed.

The around-vehicle visual recognition unit 10 may draw in the images of the backside camera, auxiliary lines for backward monitoring 52 on the highway. The auxiliary lines for backward monitoring 52 may be rearward extension lines of the vehicle 25 with distance marks 52a as a measure. The distance marks 52a may be used as a distance measure from the back of the vehicle 25. An interval between the distance marks 52a may be longer than those used on the general road, for example, same as an interval of following distance confirmation sign boards, about 50 m. As a result of the marks 52a, the driver can figure out a distance between his/her vehicle and a following vehicle.

As discussed above, the driver can also set the interval between the distance-measuring auxiliary lines 52a for each type of roads such as the general road and/or the highway, or for each travel speed. As another option, the auxiliary lines for backward monitoring 52 and the distance-measuring auxiliary lines 52a can be set to display only when other vehicles are recognized in the images of the backside camera.

Next, it is determined whether the direction indicator of the vehicle 25 is operating (Step S804). If the direction indicator of the vehicle 25 is operating (Step 804=Yes), a lane change may be taken into account. Hence, the images of the side camera on the side of the operating direction indicator, i.e., on a turning direction side may be displayed (Step S805).

In this case, as shown in screen (b-2) in FIG. 8, a side-camera screen 51c showing the images of, for example, the side camera 23, along with a backside camera screen 51a are displayed on the display unit 17. The screen 51 as shown in representation (b-1) in FIG. 8 is divided into 2 screens: the backside camera screen 51a on which images of the backside camera are displayed and the side camera screen 51c on which images of the side camera are displayed. Based on the images, the driver can visually recognize other vehicles that intend to pass his/her vehicle from behind. When the backside camera screen 51a and the side camera screen 51c are displayed at the same time, a direction of the side camera screen 51c may be changed in accordance with a direction of the backside camera screen 51a by executing vertical flip. If the direction indicator of the vehicle 25 is not operating (Step S804=No), since a lane change is not taken into account, it is not necessary to display the images of the side camera. Instead of, or in addition to, operating the direction indicator, a steering angle computed by the steering sensor 16, may be used to determine whether a lane change is occurring.

In case the vehicle is not traveling at a high speed (Step S801=No), it is determined whether the direction indicator of the vehicle 25 is operating (Step S804). In other words, in a traffic jam, an operation of the direction indicator triggers displaying of the images of the side camera.

Figure 10:
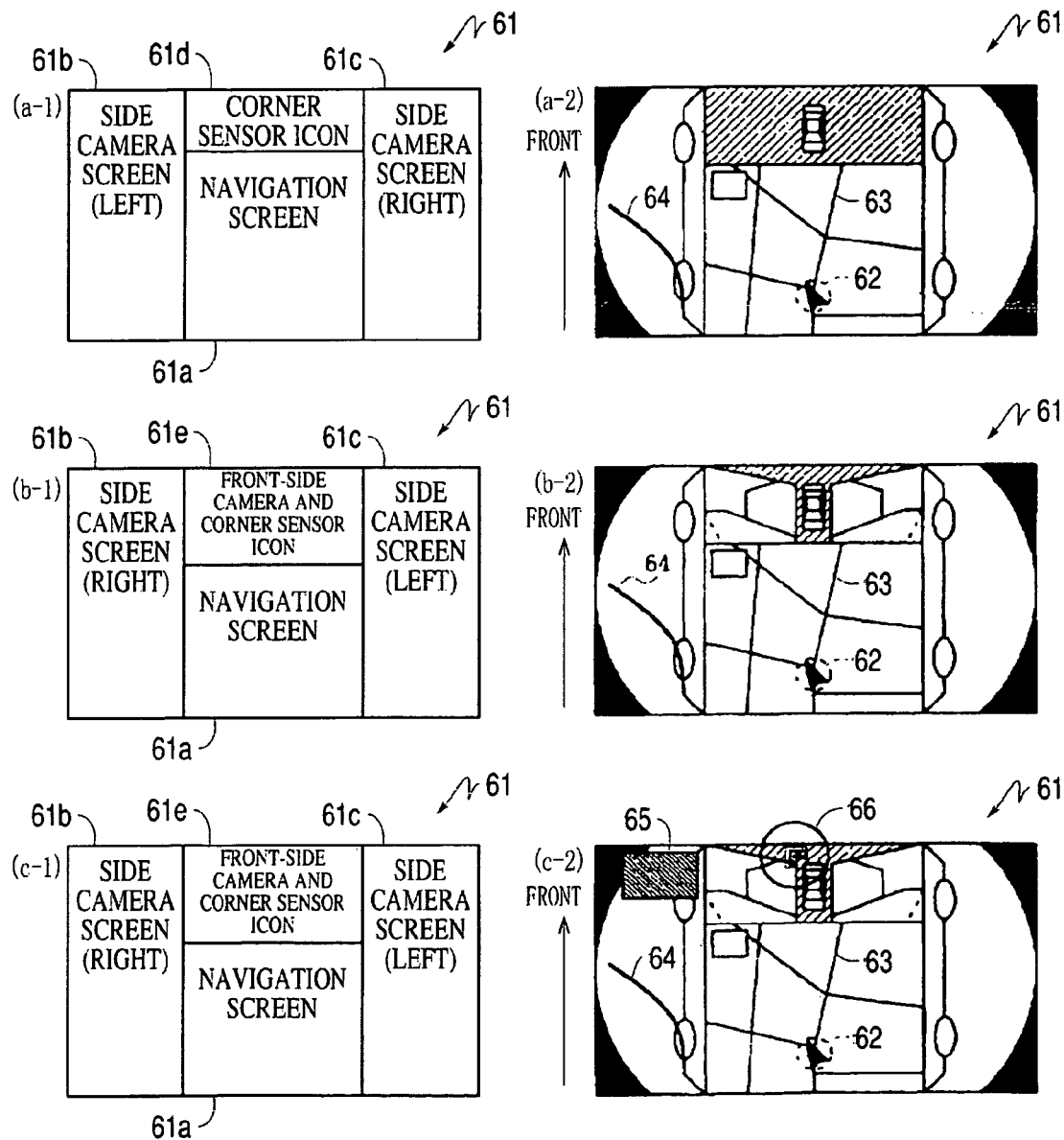
FIG. 10 shows an exemplary screen for showing narrow road information.
Figure 11:
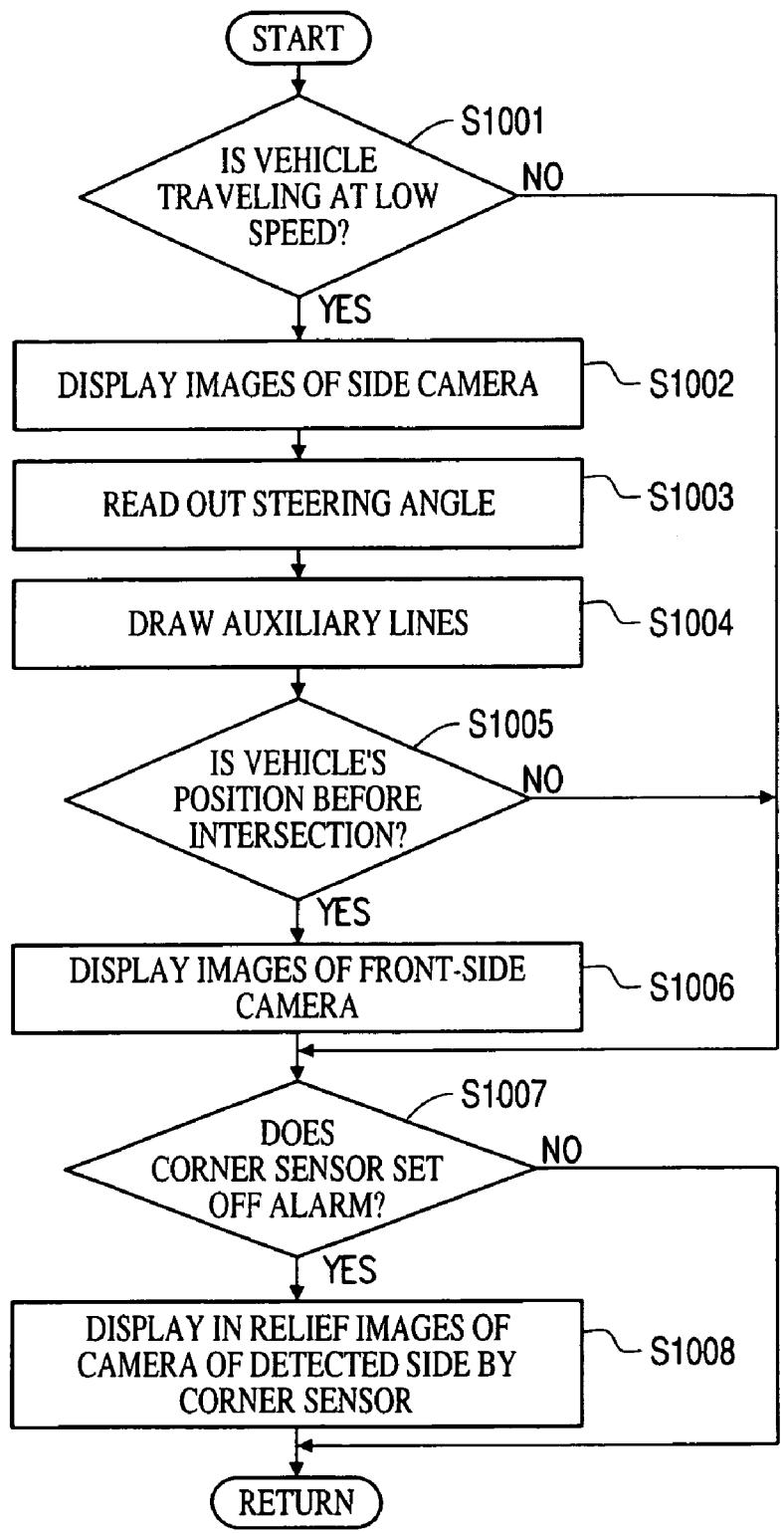
FIG. 11 shows an exemplary method of providing narrow road information.

FIG. 10 shows an exemplary display that may be displayed during a narrow street processing. FIG. 11 shows an exemplary method of providing narrow road information. The exemplary method may be implemented, for example, by one or more components of the above-described around-vehicle visual recognition apparatus 10. However, even though the exemplary structure of the above-described around-vehicle visual recognition apparatus 10 may be referenced in the description, it should be appreciated that the referenced structure is exemplary, and the exemplary method need not be limited by any of the above-described exemplary structure.

Note that screen representations (a-1), (b-1) and (c-1) in FIG. 10 show display contents of a divided screen, and screens (a-2), (b-2) and (c-2) in FIG. 11 show screen-display examples.

First, if the narrow street processing starts, it is determined whether the vehicle is traveling at a low speed (Step S1001). For example, it may be determined whether the speed computed by the position-detecting unit 12 is lower than a predetermined speed for the narrow street, for example, about 10 km/hour.

If the vehicle is traveling at a low speed (Step S1001=Yes), it can be assumed that the driver is driving with his/her attention directed to the vicinity of the vehicle. Thus, images of a side camera or side cameras are displayed (Step S1002). For example, the around-vehicle visual recognition unit 10 may cause the display unit 17 display images taken by the side camera(s) 23. In this case, for example, a screen 61 as shown in screen (a-2) in FIG. 10 may be displayed on the display unit 17. Note that the screen 61 as shown in representation (a-1) in FIG. 10 may be divided into 4 screens: a navigation screen 61a on which navigation images by the navigation unit 11 may be displayed, a left-side camera screen 61b on which images of the left-side camera may be displayed, a right-side camera screen 61c on which images of the right-side camera may be displayed, and a corner sensor icon screen 61d on which the corner sensor icon may be displayed. In this case, on the left-side camera screen 61b, the right-side camera screen 61c, and the corner sensor icon screen 61d, the front of the vehicle 25 is oriented upward. In the navigation screens, for example, a vehicle position mark 63 indicating a driver's vehicle position and road lines 64 showing roads may be shown.

Next, a steering angle is computed, for example, by the steering sensor 16, and read out (Step S1003) and an auxiliary line, such as an anticipated side track line 64 shown in screen (a-2) in FIG. 10, is drawn (Step S1004) on the basis of the read steering angle. Note that screen (a-2) in FIG. 10 shows a case of the vehicle 25 turning to the left at an intersection, and that in screen (a-2) in FIG. 10, the anticipated side track line 64 indicates an anticipated track of a left back corner or a left back wheel of the vehicle 25, on a turning inside.

Next, it is determined whether the vehicle 25 is before an intersection (Step S1005). For example, it may be determined whether the intersection is within a predetermined distance from the vehicle position; for example, about 10 m. If the intersection is within a predetermined distance (Step S1005=Yes), it is assumed that the driver's vehicle position is before an intersection and, for example, the around-vehicle visual recognition apparatus 10, in preparation for a turn, may cause the display unit 17 to display images of the front-side camera 22. In this case, for example, a screen 61 shown in screen (b-2) in FIG. 10 is displayed on the display unit 17. And the screen 61, as shown in representation (b-1) in FIG. 10, may be divided into 4 screens: a navigation screen 61a, a left-side camera screen 61b, a right-side camera screen 61c, and a front-side camera and a corner sensor icon screen 61e on which pictures of the front-side camera and the corner sensor icon may be displayed. If the vehicle 25 is not before an intersection (Step S1005=No), it is not necessary to display images of the front-side camera. Also, if the vehicle 26 is not traveling at a low speed (Step S1001=No), the around-vehicle visual recognition apparatus 10 may not perform operations from displaying of images of the side camera (Step S1002) to displaying of images of the front-side camera (Step S1006).

Next, it is determined whether the corner sensor 15 detects that a corner of the vehicle 25 is within a set distance from an obstacle, in other words, whether the corner sensor 15 sets off an alarm (Step S1007). If the corner sensor 15 does not set off the alarm (Step S1007=No), then operation of the method ends. If the corner sensor 15 sets off the alarm (Step S1007=Yes), a corresponding corner is displayed, for example, as shown in screen (c-2) in FIG. 10. In the example shown in screen (c-2) in FIG. 10, the around-vehicle visual recognition apparatus 10 may displays the corresponding corner by surrounding it with a frame 65. In this case, to attract driver's attention, an inside color of the frame 65 may be different from other parts, an inside image of the frame 65 may be blinked, only an inside image of the frame 46 may be amplified, a corner sensor icon could be displayed, and/or an warning beep could be set off from the voice output unit 18.

According to the above examples, the around-vehicle visual recognition unit 10 may makes the display unit 17 shift between a plurality of images of the area around a vehicle area, for example, in accordance with the vehicle's circumstances. Accordingly, a driver may obtain accurate information about the area around the vehicle by visually recognizing the images on the display unit 17. Thus, the driver may easily and safely drive a vehicle without worry.

According to the above examples, the around-vehicle visual recognition apparatus 10 may cause the display unit 17 to shift the display of the plurality of images based on a current location of the vehicle 25. The current location of the vehicle 25 may, for example, identify types of places of the current location of the vehicle 25, for example, a parking lot and/or a road, or identify road attributes. For example, in case that the genres of a current location of the vehicle 25 are a parking lot, a general road, a highway, a narrow street, and/or an intersection, images of a backside camera(s) 24, images of a side camera(s) 23, and images of a front-side camera(s) 22 may be displayed in shifts on the display unit 17, in accordance with the location of the vehicle. Therefore, a driver can visually recognize images of an area(s) around the vehicle that is most useful to the driver depending on the circumstances of the vehicle 25.

According to the above examples, the around-vehicle visual recognition apparatus 10 may makes the display unit 17 shift the images displayed in accordance with driving situations, such as, a travel speed or a driving direction. Accordingly, for example, based on the travel speed, the displays may be as follows: if on a general road and/or a highway and/or the travel speed is higher than a predetermined speed, the images of the backside camera are displayed in shifts on the display unit 17; if on a narrow street and/or the travel speed is lower than a predetermined speed, the images of the side camera are displayed in shifts on the display unit 17. Therefore, the driver can visually recognize images of the areas around the vehicle most useful to the driver.

According to the above examples, the around-vehicle visual recognition apparatus 10 makes the display unit 17 shift the images displayed in accordance with driving situations, such as the driving direction. The driving direction may include going straight ahead, reversing, or turning right or left. For example, if on a general road and/or a highway and/or the travel speed is higher than a predetermined speed, when the driving direction is going straight ahead, the images of the backside camera are displayed in shifts on the display unit 17. When the driving direction is one of the turning directions, the images of the side camera are displayed in shifts on the display unit 17. If on a narrow street and/or the travel speed is lower than a predetermined speed, when the driving direction at the intersection is one of the turning directions, the images of the front-side camera are displayed in shifts on the display unit 17. Therefore, a driver can visually recognize images of an area or areas most useful based on the driving situations of the vehicle 25.

According to the above examples, when the around-vehicle visual recognition apparatus 10 determines that the vehicle 25 is parking on the basis of circumstances of the vehicle 25, it may cause the display unit 17 to display the images of the backward and the sides of the vehicle 25, an anticipated track of the back of the vehicle 25 in the images of the backward, and/or an anticipated track of the front-side edge of the vehicle 25 in the images of sides. For example, if the driver's vehicle location not on a road, the around-vehicle visual recognition apparatus 10 may determine that the vehicle is parking and may cause the display unit 17 display the backside camera screen 31$a$, the left side camera screen 31$b$, and the right side camera screen 31$c$. An anticipated whole track line 32 may be displayed on the backside camera screen 31$a$, and an anticipated side track line 33 may be displayed on the left side camera screen 31$b$ or the right side camera screen 31$c$. Note that the anticipated whole track line 32 and the anticipated side track line 33 may be drawn on the basis of a steering angle read by the steering sensor 16. Therefore, when parking the vehicle, the driver can visually recognize the area behind the vehicle 25 and can accurately understand the anticipated track of the back of the vehicle 25 thereby easily and safely driving the vehicle. Further, the driver can visually recognize obstacles on the sides of the vehicle by visually recognizing images of the sides of the vehicle 25. Therefore, when turning by backing the vehicle 25, the driver can accurately understand the anticipated track of the front-side edge passing the extreme outside and can avoid contacts against the obstacles on the sides.

In accordance with the above examples, the around-vehicle visual recognition apparatus 10 may determines that the vehicle 25 is traveling on a road, for example, on the basis of conditions of the vehicle 25. When traveling at a high speed, the around-vehicle visual recognition apparatus 10 may cause the display unit 17 to display images of behind of the vehicle 25 including extension lines of the vehicle 25 having a. When traveling at a low speed, the around-vehicle visual recognition apparatus 10 may make the display unit 17 display images of the turning direction side of the vehicle 25, when the vehicle 25 is making a turn.

Thus, for example, when the vehicle is traveling at a high speed on a general road or a highway, the around-vehicle visual recognition apparatus 10 may cause the display unit 17 to display a backside camera screen 41$a$ or 51$a$. On the backside camera screen 41$a$ or 51$a$, auxiliary lines for backward monitoring 42 or 52 with distance-measuring auxiliary lines 42$a$ or 52$a$ may be drawn. As a result, the driver can figure out a distance between his/her vehicle and a following vehicle. When traveling at a high speed and making a turn, the around-vehicle visual recognition apparatus 10 may cause the display unit 17 to display images of the turning direction side of the vehicle 25. As a result, the driver can visually recognize other vehicles that may intend to pass his/her vehicle from behind.

When the vehicle 25 is traveling at a high speed on a general road or a highway and is making a turn thereon, the around-vehicle visual recognition apparatus 10 may cause the display unit 17 to display a side camera screen 41$c$ or 51$c$. Therefore, the driver can visually recognize obstacles and other vehicles on the sides. Further, when the vehicle 25 is traveling at a low speed on a general road and is making a turn thereon, an anticipated side track line 45 as an anticipated track of the backside edge of the vehicle 25 may be drawn on the side camera screen 41$c$. Therefore, the driver can accurately understand the anticipated track of the backside edge passing the extreme inside and can avoid contacts against the obstacles on the sides.

Figure 12A:
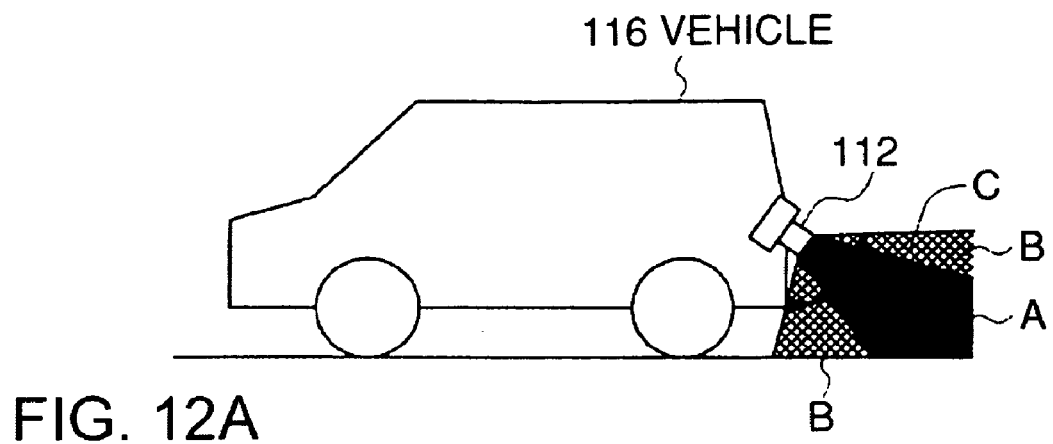
FIGS. 12A-12C show an exemplary image area of an around-vehicle visual recognition apparatus.
Figure 12B:
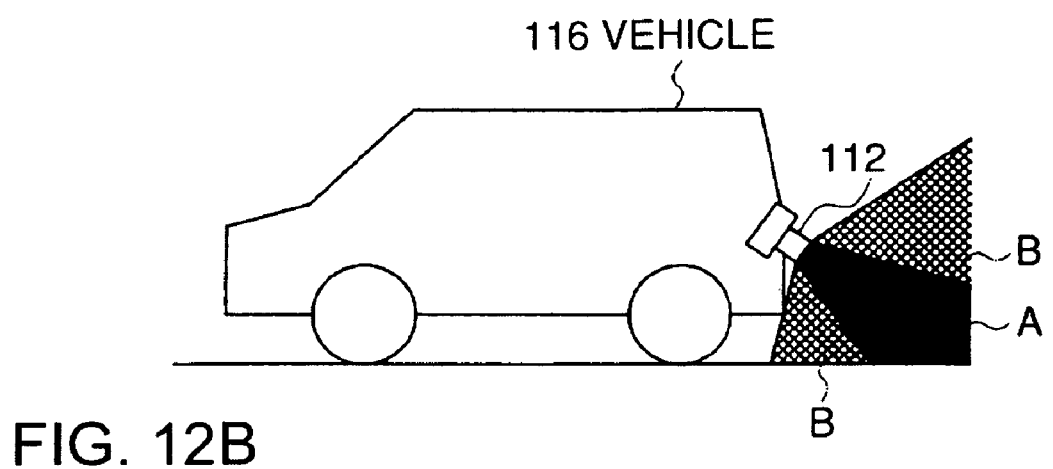
Figure 12C:
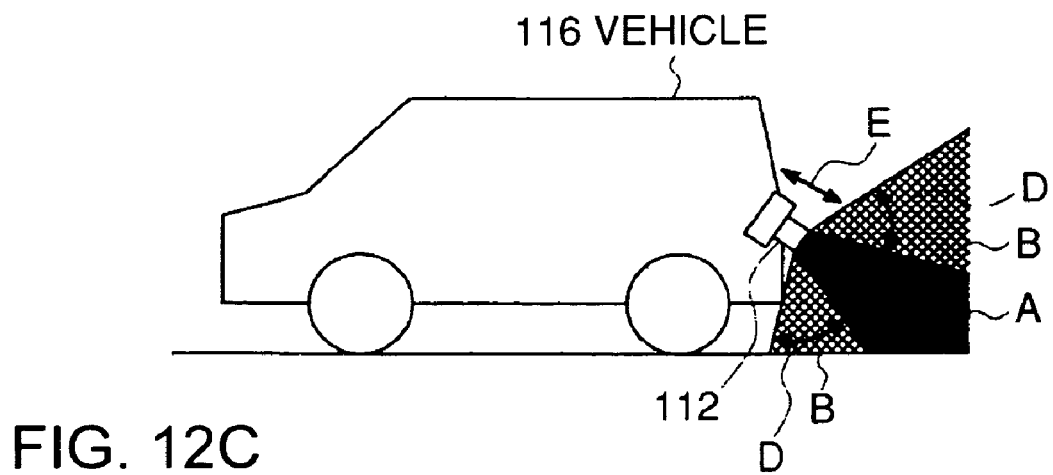
Figure 13:
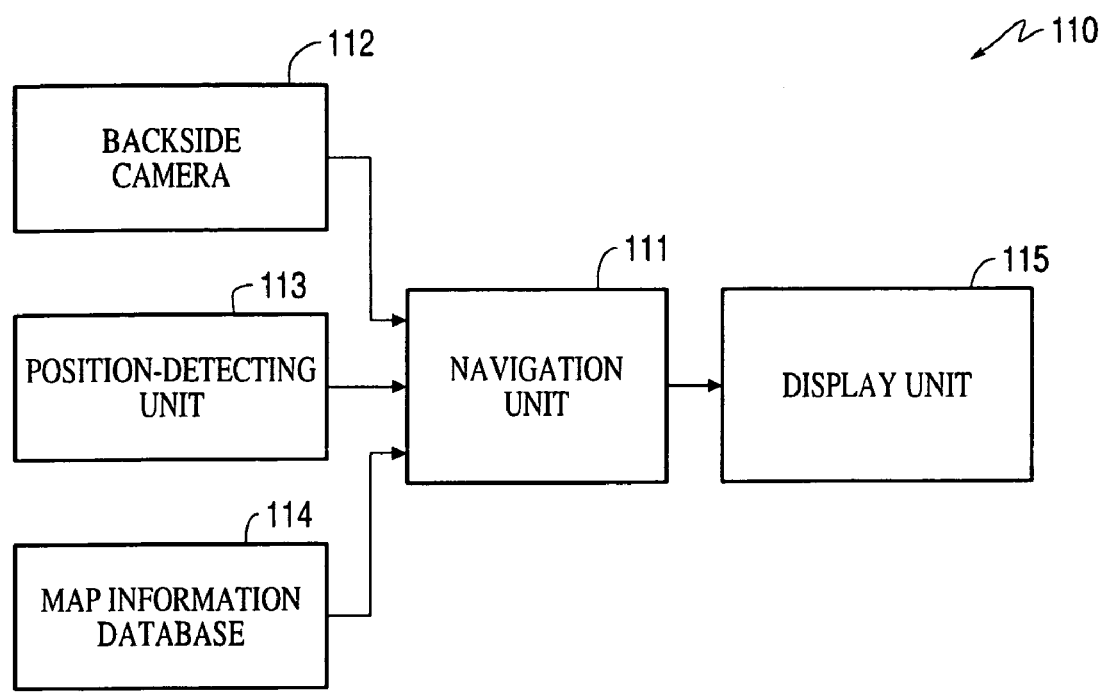
FIG. 13 is a block diagram showing an exemplary around-vehicle visual recognition apparatus.

FIGS. 12A-12C show image-areas of an exemplary around-vehicle visual recognition apparatus 110 when mounted on a vehicle 116. FIG. 13 is a block diagram showing the exemplary around-vehicle visual recognition apparatus 110. For ease of explanation, elements and advantages of the around-vehicle visual recognition apparatus 110 that are similar to the previously described around-vehicle visual recognition apparatus 10 may be omitted from the following description.

As shown in FIG. 13, the around-vehicle visual recognition apparatus 110 may include a navigation unit 111, for example, similar to the navigation unit 11, previously described. The navigation unit 111 may include a camera controller for controlling a backside camera 112. The camera controller may be separate from and attached to the navigation unit 111 or include in the navigation unit 111.

As shown in FIGS. 12A-12C, a vehicle 116 may mounts the backside camera 112. The backside camera 112 may be provided with, for example, an image pickup unit such as CCD (Charge Coupled Device) and/or CMOS (Complementary Metal Oxide Semiconductor) and an optical system such as, for example, a lens or PRISM. As shown in FIG. 12, the backside camera 112 may be set on a back of the vehicle, may take images of the backside area of the vehicle 116 and may transmit the images to the navigation unit 111. Note that the backside camera 112 may be two or more cameras.

The backside camera 112 may include a changeable image-area unit that permits the camera 112 to change image areas. The changeable image-area unit may include, for example, a changeable focus mechanism such as zoom lens that changes the focus distance of optical system. Accordingly the camera 112 can change image modes from wide angle to telephoto, in other words, zoom. The changeable image-area unit may be one that changes an image area by using a wide-angle lens and/or a fisheye lens for the primary lens or in addition to a primary lens. In addition, the changeable image-area unit may move the image area, for example, side to side and/or up and down, in other words, the changeable image-area unit may allow tilt and/or pan, for example, by moving the entire backside camera 112 and/or a part of the camera 112, such as moving or rotating the optical axis of the optical lens from side to side and up and down. The backside camera 112 may be controlled by, for example, the navigation unit 111.

As shown in FIGS. 12A-12C, the image-area of the backside camera 112 may be changeable. An image-area A of the backside camera 112 is an exemplary default or standard setting condition and an image-area B of the backside camera 112 is a maximum image-area setting. FIG. 12A illustrates the up and down rotation of the backside camera 112 on its optical axis by tilting and shows, by arrow C, the possible changes of the image-area of the backside camera 112 within the maximum image-area. FIG. 12B illustrates the variable image area of the backside camera 112. That is, the maximum image-area B may be increased by using a wide image-area lens such as wide-angle lens and/or fisheye lens. In case of using fisheye lens, it is preferable to narrow the image-area to a predetermined area. FIG. 12C illustrates how the optical system of the backside camera 112 may be changed from wide-angle lens to telescope lens, for example, by zooming. That is, it is possible to change the image-area of the backside camera 112 within the maximum image-area B, as shown with arrows D, by changing the focus distance of the optical system as shown with arrow E. It should be appreciated that it is possible to change the image-area of the backside camera 112 in a number of ways by conveniently combining the above operations: tilting, using wide image-area lens, and/or zooming.

The navigation unit 111 may include or be connected to a position-detecting unit 113, similar to position detection unit 12. The position-detecting unit 113 may detect, for example, a current location, a vehicle travel speed, a vehicle accelerated velocity, vehicle orientation using a variety of sensors. The navigation unit 111 may also include a map information database 114, similar to map information database 13 for storing map information necessary to search for facilities, geographic points, and/or routes.

The navigation unit 111 may change the image-area of the backside camera 112 in accordance with the circumstances of the vehicle, as well as in accordance with ordinary navigation functions such as detecting facilities and/or geographical points. For example, in accordance with the current vehicle location of the vehicle 116, a travel speed, and/or a driving direction, the navigation unit 111 may cause the image-area of the backside camera 112 to be changed The images may be displayed on the display unit 115.

For example, when the vehicle 116 is traveling on a highway, the image area may be set as about 50 to 200 meters behind the vehicle 116. When the vehicle 116 is traveling on a general road, the image area may be set at about 5 to 50 meters behind the vehicle 16. When the vehicle 116 is traveling on a narrow street, the image area may be set at about 0 to 5 meters behind the vehicle 116. In addition, when, for example, the vehicle 116 is traveling on a general road, the higher the travel speed gets, the image area may become farther from the vehicle 116 and/or utilize a wider angle. Note that according to this example, the backside camera images taken by the backside camera 112 may be continuously displayed irrespective of the vehicle circumstances. If the driver determines that the display of the images from camera 112 is unnecessary, the driver can adjust the settings to not display the images of camera 112 by, for example, operating an input switch and/or by changing a setting on a setting screen.

Figure 14:
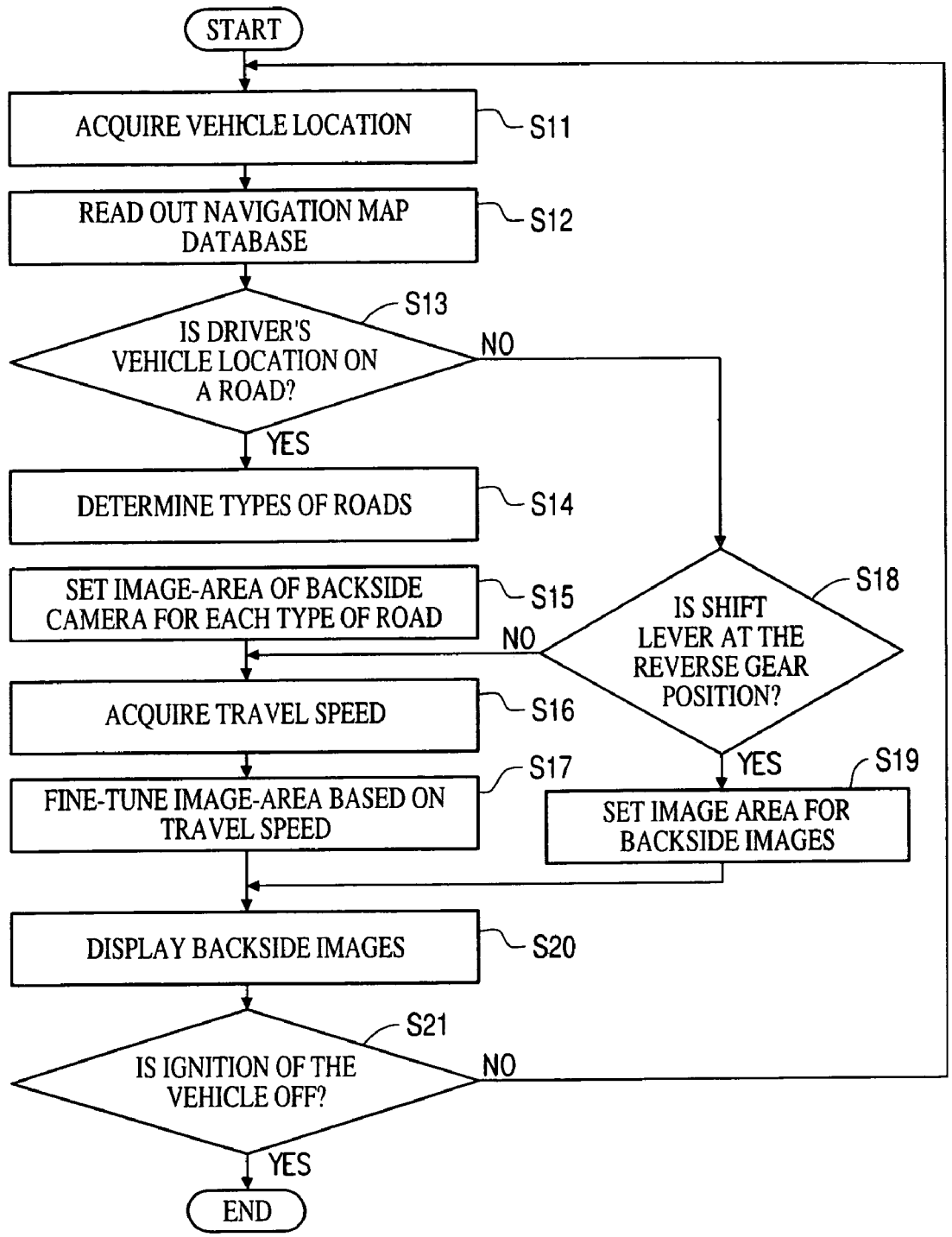
FIG. 14 shows an exemplary around-vehicle visual recognition method.

FIG. 14 shows an exemplary around-vehicle visual recognition method. The exemplary method may be implemented, for example, by one or more components of the above-described around-vehicle visual recognition apparatus 110. However, even though the exemplary structure of the above-described around-vehicle visual recognition apparatus 110 may be referenced in the description, it should be appreciated that the referenced structure is exemplary, and the exemplary method need not be limited by any of the above-described exemplary structure.

As shown in FIG. 14, first, a driver's vehicle location is acquired (Step S11). For example, the position-detecting unit 113 may acquire as the driver's vehicle location, a current location of the vehicle 116 detected by a variety of sensors, such as a GPS sensor, a magnetic sensor, a gyro sensor, and/or a vehicle speed sensor. Next, map data is reads out (Step S12), for example, from a navigation map database, such as, map information database 114. The map information may include road data on the driver's vehicle location road and/or facility data.

Next, it is determined whether the driver's vehicle location is on a road (Step S13). If the driver's vehicle location is on a road (Step S13=Yes), the types of roads, for example along the route or within a certain area, are determined (Step S14). For example, it may be determined whether the roads include general roads, highways, and/or narrow streets, as they are defined above.

Then, the image area of the backside camera 112 is set for each type of roads (Step S15). For example, on a highway, the image-area may be set as about 50 to 200 meters behind the vehicle 16. When the vehicle 16 is traveling on a general road, the image-area may be set as about 5 to 50 meters behind the vehicle 116. When the vehicle 116 is traveling on a narrow street, the image-area may be set as about 0 to 5 meters behind the vehicle 116.

Next, a travel speed, for example, computed by the position-detecting unit 113 is acquired (Step S16) and the image-area is fine-tuned based on the travel speed (Step S17). In this case, the image area may be fine-tuned by widening or narrowing the optical axis angle of the backside camera 112 according to the image-area set for each type of roads based on the travel speed of the vehicle 116. The optical axis angle of the backside camera 112 may get fine-tuned wherein the higher the speed of the vehicle 116, the further the image area from the vehicle 116. A range of fine-tuning may be predetermined for each type of road and stored in a storage unit of the navigation unit 111.

If the driver's vehicle location is out of a road (Step S13=No), it may be assumed that the driver's vehicle location is on a parking lot or a facility site, as discussed above. It is then determined whether a shift lever is at a reverse gear's position (Step S18), that is, whether the driver intends to park the vehicle or not. If the shift lever's position is not at the reverse gear (Step S18=No), it is considered that the driver does not intend to park the vehicle, thus, as described above, a travel speed is acquired (Step S16) and fine-tuned (Step S17). If the shift lever is at the reverse gear's position (Step S18=Yes), the around-vehicle visual recognition apparatus 110 sets image-area of the backside camera 112 for reverse parking (Step S19). For example, the image-area may be set at about 0 to 5 meters behind the vehicle 116.

Next, the backside camera images are displayed (Step S20), for example, on the display unit 115. It is then determined whether an ignition of the vehicle 116 is off (Step S21). If the ignition is not off (Step S21=No), the vehicle 116 is still running, and thus the around-vehicle visual recognition unit 110 again acquires the vehicle's location and repeats the above-described proceeding (return to Step S11). If the ignition is off (Step S21=Yes), the vehicle 116's engine has stopped and operation of the method ends.

According to the above examples, the around-vehicle visual recognition apparatus 110 may change an image-area in accordance with the vehicle's circumstances and may display backside images on the display unit 115. Thus, a driver may obtain accurate information about the rear of the vehicle, by visually recognizing images on the display unit 115 and can easily and safely drive the vehicle.

The around-vehicle visual recognition apparatus 110 may change the image area based on the current locations of the vehicle 116. Thus if the current location of the vehicle 116 includes a parking lot, a general road, a highway, and/or a narrow street, in accordance with each location's attributes, the around-vehicle visual recognition apparatus 110 may change an image distance from the vehicle back edge, for example, by rotating the backside camera 112 on its optical axis, or by changing the focus distance. Therefore, a driver can visually recognize an area of the rear of the vehicle that is highly relevant to the vehicle's situation.

For example, in the case of a parking lot, since the image-area may be about 0-5 meters from the back edge of the vehicle 116, it is possible to visually recognize backside camera images of the area necessary for reverse parking of the vehicle 116. In the case of a highway, since the image-area may be about 50-200 meters from the back edge of the vehicle 116, it is possible to visually recognize other vehicles approaching from behind at a high speed.

As discussed above, the around-vehicle visual recognition apparatus 110 may change the image area based on a travel speed and/or a driving direction of the vehicle 116. When the travel speed is considered, the image-area may be changed so as to take a further-away image area from the vehicle 116 as the vehicle 116 speeds up. That is, the higher the speed, the longer the inter-vehicle distance becomes, thus, the driver can visually recognize backside camera images highly relevant to the travel speed of the vehicle 116.

When driving direction is considered, the around-vehicle visual recognition apparatus 110 may change the image area based on whether the driving direction is forward or backward. When a vehicle's shift lever is at the reverse gear's position in a parking lot, it may be considered that a driver intends to park the vehicle, thus, the around-vehicle visual recognition apparatus 110 sets image-area as about 0 to 5 meters behind the vehicle 116. Therefore, a driver can visually recognize an area of the rear of the vehicle that is highly relevant to the vehicle's situation.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An around-vehicle visual recognition apparatus, comprising:
    a controller that:
    identifies a type of road traveled by a vehicle;
    causes a camera to take backside images of the vehicle; and
    causes the backside images to be displayed on a display;
    superimposes distance marks on the displayed backside images at an interval set depending on the identified road type, the distance marks serving as distance measures from a back of the vehicle.

2. The around-vehicle visual recognition apparatus of claim 1, wherein the road type includes at least one of:
    a general road; and
    a highway.

3. A navigation system comprising the around-vehicle visual recognition apparatus of claim 1.

4. An around-vehicle visual recognition method, comprising:
    identifying a type of road traveled by a vehicle;
    causing a camera to take backside images of the vehicle;
    displaying the backside images on a display; and
    superimposing by a controller distance marks on the displayed backside images at an interval set depending on the identified road type, the distance marks serving as distance measures from a back of the vehicle.

5. The around-vehicle visual recognition method of claim 4, wherein the road type comprises at least one of:
    a general road; and
    a highway.

6. The around-vehicle visual recognition method of claim 4, further comprising drawing auxiliary lines for backward monitoring on the displayed backside images, the auxiliary lines being extension lines extending backward from both sides of the vehicle.

7. The around-vehicle visual recognition method of claim 4, further comprising:
acquiring a speed of the vehicle; and
setting the interval between the distance marks based on the acquired speed of the vehicle.

8. The around-vehicle visual recognition method of claim 4, further comprising:
acquiring a current position of the vehicle;
acquiring road data; and
displaying navigation images on the display with the backside images, the navigation images including a vehicle position mark indicating the acquired current position of the vehicle; and road lines showing roads included in the acquired road data.

9. A non-transitory computer-readable storage medium storing a computer-executable program usable to visually display an area around a vehicle, the program comprising:
instructions for identifying a type of road traveled by the vehicle;
instructions for causing a camera to take backside images of the vehicle;
instructions for displaying the backside images on a display; and
instructions for drawing distance marks on the displayed backside images at an interval set depending on the identified road type, the distance marks serving as distance measures from a back of the vehicle.

10. The around-vehicle visual recognition apparatus of claim 1, wherein the controller also draws auxiliary lines for backward monitoring on the displayed backside images, the auxiliary lines being extension lines extending backward from both sides of the vehicle.

11. The around-vehicle visual recognition apparatus of claim 1, wherein the controller:
acquires a speed of the vehicle; and
sets the interval between the distance marks based on the acquired speed of the vehicle.

12. The around-vehicle visual recognition apparatus of claim 1, wherein the controller:
acquires a current position of the vehicle;
acquires road data; and
displays navigation images on the display with the backside images, the navigation images including a vehicle position mark indicating the acquired current position of the vehicle; and road lines showing roads included in the acquired road data.

* * * * *